(12) United States Patent
Lyu

(10) Patent No.: US 10,492,183 B2
(45) Date of Patent: Nov. 26, 2019

(54) CSI REPORTING METHOD, CSI RECEIVING METHOD, AND APPARATUS

(71) Applicant: HUAWEI TECHNOLOGIES CO., LTD., Shenzhen, Guangdong (CN)

(72) Inventor: Yongxia Lyu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 15/708,804

(22) Filed: Sep. 19, 2017

(65) Prior Publication Data

US 2018/0007686 A1 Jan. 4, 2018

Related U.S. Application Data

(63) Continuation of application No. PCT/CN2015/074700, filed on Mar. 20, 2015.

(51) Int. Cl.
*H04L 12/801* (2013.01)
*H04L 12/24* (2006.01)
(Continued)

(52) U.S. Cl.
CPC ....... *H04W 72/0413* (2013.01); *H04L 5/0053* (2013.01)

(58) Field of Classification Search
CPC .... H04W 72/0413; H04L 5/12; H04L 5/0091; H04L 5/023; H04L 5/0053
See application file for complete search history.

(56) References Cited

U.S. PATENT DOCUMENTS 8,364,969 B2 * 1/2013 King ............... G06F 21/6254
713/182
8,935,177 B2 * 1/2015 Wiley ............... G06Q 30/0246
705/14.4
(Continued)

FOREIGN PATENT DOCUMENTS

CN  102255694  11/2011
CN  102315910  1/2012
(Continued)

OTHER PUBLICATIONS

3GPP TSG RAN WG1 Meeting #80 R1-150209, *HARQ-ACK transmission for supporting CA of up to 32 carriers*, LG Electronics, Feb. 9-13, 2015 (5 pp.).
(Continued)

*Primary Examiner* — Brian S Roberts
*Assistant Examiner* — Abusayeed M Haque
(74) *Attorney, Agent, or Firm* — Leydig, Voit & Meyer, Ltd.

(57) ABSTRACT

The present invention relates to the field of communications technologies, and in particular, to a CSI reporting method, a CSI receiving method, and an apparatus, to resolve a technical problem that PUCCH resource overheads are relatively large during CSI reporting. In embodiments of the present invention, at least two PUCCH resources are configured for each downlink carrier group. CSI that needs to be reported in one uplink subframe may be obtained, and a format of a corresponding PUCCH resource is determined according to the to-be-reported CSI. For example, the determined format is referred to as a first format. Then, all of the to-be-reported CSI is reported after being added to a first first-format PUCCH resource.

20 Claims, 4 Drawing Sheets

(51) Int. Cl.
*H04L 5/14* (2006.01)
*H04L 29/06* (2006.01)
*H04W 72/04* (2009.01)
*H04L 5/00* (2006.01)

(56) References Cited

U.S. PATENT DOCUMENTS

| | | | | |
|---|---|---|---|---|
| 9,300,637 | B1* | 3/2016 | Kothari | H04L 63/0428 |
| 2012/0076028 | A1* | 3/2012 | Ko | H04L 1/0026 370/252 |
| 2013/0003668 | A1* | 1/2013 | Xiao | H04L 5/001 370/329 |
| 2013/0058295 | A1* | 3/2013 | Ko | H04B 7/063 370/329 |
| 2013/0230007 | A1* | 9/2013 | Nagata | H04L 1/0026 370/329 |
| 2013/0279356 | A1* | 10/2013 | Park | H04W 24/02 370/252 |
| 2013/0343316 | A1* | 12/2013 | Pajukoski | H04L 5/0048 370/329 |
| 2014/0169204 | A1 | 6/2014 | Cheng et al. | |
| 2015/0058950 | A1* | 2/2015 | Miu | H04L 63/105 726/7 |
| 2015/0195830 | A1 | 7/2015 | Takeda et al. | |
| 2015/0326289 | A1* | 11/2015 | Kim | H04B 7/0639 375/267 |
| 2015/0327230 | A1 | 11/2015 | Takeda et al. | |
| 2016/0085915 | A1* | 3/2016 | Seow | G16H 10/60 705/3 |
| 2016/0147945 | A1* | 5/2016 | MacCarthy | G06F 21/6254 705/51 |

FOREIGN PATENT DOCUMENTS

| | | |
|---|---|---|
| CN | 102938680 | 2/2013 |
| JP | 2014033314 A | 2/2014 |
| WO | WO2014097776 | 6/2014 |

OTHER PUBLICATIONS

3GPP TSG RAN WG1 Meeting #80 R1-150410, *Enhancements to ACK/NAK on PUCCH for up to 32 component carriers*, Huawei, HiSilicon, Feb. 9-13, 2015 (3 pp.).
Extended European Search Report, dated Mar. 1, 2018, in European Application No. 15885803.5 (11 pp.).
R2-150389, Ericsson, "PUCCH on SCell," 3GPP TSG-RAN WG2 #89, Athens, Greece, Feb. 9-13, 2015, pp. 1-4.
Notice of Reasons for Rejection, dated Oct. 9, 2018, in Japanese Application No. 2017549245 (5 pp.).
International Search Report, dated Dec. 21, 2015, in International Application No. PCT/CN2015/074700 (4 pp.).
3rd Generation Partnership Project; Technical Specification Group Radio Access Network; Evolved Universal Terrestrial Radio Access (E-UTRA); *Physical channels and modulation* (Release 12), 3GPP TS 36.211 V12.5.0 (Mar. 2015), pp. 1-136.
3rd Generation Partnership Project; Technical Specification Group Radio Access Network; Evolved Universal Terrestrial Radio Access (E-UTRA); *Multiplexing and channel coding* (Release 12), 3GPP TS 36.212 V12.4.0 (Mar. 2015), pp. 1-94.
3rd Generation Partnership Project; Technical Specification Group Radio Access Network; Evolved Universal Terrestrial Radio Access (E-UTRA); *Physical layer procedures* (Release 12), 3GPP TS 36.213 V12.2.0 (Jun. 2014), pp. 1-207.
3rd Generation Partnership Project; Technical Specification Group Radio Access Network; Evolved Universal Terrestrial Radio Access (E-UTRA); *Physical layer procedures* (Release 12), 3GPP TS 36.213 V12.4.0 (Dec. 2014), pp. 1-225.
International Search Report dated Dec. 21, 2015 in corresponding International Patent Application No. PCT/CN2015/074700.

\* cited by examiner

CSI REPORTING METHOD, CSI RECEIVING METHOD, AND APPARATUS

CROSS-REFERENCE TO RELATED APPLICATION

This application is a continuation of International Application No. PCT/CN2015/074700, filed on Mar. 20, 2015, the disclosure of which is hereby incorporated by reference in its entirety.

TECHNICAL FIELD

The present invention relates to the field of communications technologies, and in particular, to a CSI reporting method, a CSI receiving method, and an apparatus.

BACKGROUND

In addition to supporting implicit feedbacks of channel status information such as an RI (rank indication), a CQI (channel quality indicator), and a PMI (precoding matrix indication) of an LTE system, an LTE-A (Long Term Evolution-Advanced) system may further support a direct feedback of channel status information such as a channel matrix feedback or a channel covariance matrix feedback, which are collectively referred to as a CSI (channel state information) feedback.

In the existing LTE R12 (LTE release 12), only a PUCCH resource in a PUCCH (physical uplink control channel) format 2 is used for CSI transmission. A maximum quantity of bits that are supported by the format is 11. In addition, a 32-CA (carrier aggregation) technology is introduced to an LTE R13 (LTE release 13) system. As stipulated in the LTE R10 (LTE release 10) standard, a parameter corresponding to CSI of each downlink carrier is independently configured, and parameters such as a PUCCH resource used to transmit CSI of each downlink carrier and a report period are also independently configured. In a 32-carrier aggregation scenario, CSI corresponding to each carrier needs to be reported by using a separate PUCCH resource. Therefore, overheads of PUCCH resources occupied for CSI reporting are relatively large. In other words, a throughput of an uplink system is reduced.

SUMMARY

Embodiments of the present invention provide a CSI reporting method, a CSI receiving method, and an apparatus, to resolve a technical problem that PUCCH resource overheads are relatively large during CSI reporting.

A first aspect of the present invention provides a CSI reporting method, including:

obtaining CSI that is to be reported in an uplink subframe, where the to-be-reported CSI is corresponding to one or more downlink carrier groups, at least two PUCCH resources are configured for one downlink carrier group, and the at least two PUCCH resources have different formats;

determining, according to the to-be-reported CSI, that a format of a PUCCH resource corresponding to the to-be-reported CSI is a first format; and adding the to-be-reported CSI to a first first-format PUCCH resource, and reporting the to-be-reported CSI.

With reference to the first aspect, in a first possible implementation of the first aspect, the at least two PUCCH resources include a PUCCH resource corresponding to a PUCCH format 2 and a PUCCH resource corresponding to a PUCCH format 3; or the at least two PUCCH resources include a PUCCH resource corresponding to a PUCCH format 2 and a PUCCH resource corresponding to a PUCCH format 4; or the at least two PUCCH resources include a PUCCH resource corresponding to a PUCCH format 3 and a PUCCH resource corresponding to a PUCCH format 4; or the at least two PUCCH resources include a PUCCH resource corresponding to a PUCCH format 2, a PUCCH resource corresponding to a PUCCH format 3, and a PUCCH resource corresponding to a PUCCH format 4.

With reference to the first possible implementation of the first aspect, in a second possible implementation of the first aspect, the determining, according to the to-be-reported CSI, that a format of a PUCCH resource corresponding to the to-be-reported CSI is a first format includes:

determining, according to a quantity of carriers corresponding to the to-be-reported CSI, that the format of the PUCCH resource corresponding to the to-be-reported CSI is the first format; or determining, according to a quantity of bits of the to-be-reported CSI, that the format of the PUCCH resource corresponding to the to-be-reported CSI is the first format.

With reference to the second possible implementation of the first aspect, in a third possible implementation of the first aspect, the at least two PUCCH resources include the PUCCH resource corresponding to the PUCCH format 2 and the PUCCH resource corresponding to the PUCCH format 3; and the determining, according to a quantity of carriers corresponding to the to-be-reported CSI, that the format of the PUCCH resource corresponding to the to-be-reported CSI is the first format includes:

if the quantity of carriers is greater than a first quantity, determining that the format of the PUCCH resource corresponding to the to-be-reported CSI is the PUCCH format 3; otherwise, determining that the format of the PUCCH resource corresponding to the to-be-reported CSI is the PUCCH format 2; or the determining, according to a quantity of bits of the to-be-reported CSI, that the format of the PUCCH resource corresponding to the to-be-reported CSI is the first format includes:

if the quantity of bits is greater than a third quantity, determining that the format of the PUCCH resource corresponding to the to-be-reported CSI is the PUCCH format 3; otherwise, determining that the format of the PUCCH resource corresponding to the to-be-reported CSI is the PUCCH format 2.

With reference to the second possible implementation of the first aspect, in a fourth possible implementation of the first aspect, the at least two PUCCH resources include the PUCCH resource corresponding to the PUCCH format 2 and the PUCCH resource corresponding to the PUCCH format 4; and the determining, according to a quantity of carriers corresponding to the to-be-reported CSI, that the format of the PUCCH resource corresponding to the to-be-reported CSI is the first format includes:

if the quantity of carriers is greater than a first quantity, determining that the format of the PUCCH resource corresponding to the to-be-reported CSI is the PUCCH format 4; otherwise, determining that the format of the PUCCH resource corresponding to the to-be-reported CSI is the PUCCH format 2; or the determining, according to a quantity of bits of the to-be-reported CSI, that the format of the PUCCH resource corresponding to the to-be-reported CSI is the first format includes:

if the quantity of bits is greater than a third quantity, determining that the format of the PUCCH resource corresponding to the to-be-reported CSI is the PUCCH format 4; otherwise, determining that the format of the PUCCH resource corresponding to the to-be-reported CSI is the PUCCH format 2.

With reference to the second possible implementation of the first aspect, in a fifth possible implementation of the first aspect, the at least two PUCCH resources include the PUCCH resource corresponding to the PUCCH format 3 and the PUCCH resource corresponding to the PUCCH format 4; and the determining, according to a quantity of carriers corresponding to the to-be-reported CSI, that the format of the PUCCH resource corresponding to the to-be-reported CSI is the first format includes:

if the quantity of carriers is greater than a second quantity, determining that the format of the PUCCH resource corresponding to the to-be-reported CSI is the PUCCH format 4; otherwise, determining that the format of the PUCCH resource corresponding to the to-be-reported CSI is the PUCCH format 3; or the determining, according to a quantity of bits of the to-be-reported CSI, that the format of the PUCCH resource corresponding to the to-be-reported CSI is the first format includes:

if the quantity of bits is greater than a fourth quantity, determining that the format of the PUCCH resource corresponding to the to-be-reported CSI is the PUCCH format 4; otherwise, determining that the format of the PUCCH resource corresponding to the to-be-reported CSI is the PUCCH format 3.

With reference to the second possible implementation of the first aspect, in a sixth possible implementation of the first aspect, the at least two PUCCH resources include the PUCCH resource corresponding to the PUCCH format 2, the PUCCH resource corresponding to the PUCCH format 3, and the PUCCH resource corresponding to the PUCCH format 4; and the determining, according to a quantity of carriers corresponding to the to-be-reported CSI, that the format of the PUCCH resource corresponding to the to-be-reported CSI is the first format includes:

if the quantity of carriers is less than or equal to a first quantity, determining that the format of the PUCCH resource corresponding to the to-be-reported CSI is the PUCCH format 2; or if the quantity of carriers is greater than the first quantity and is less than or equal to a second quantity, determining that the format of the PUCCH resource corresponding to the to-be-reported CSI is the PUCCH format 3; or if the quantity of carriers is greater than the second quantity, determining that the format of the PUCCH resource corresponding to the to-be-reported CSI is the PUCCH format 4; or the determining, according to a quantity of bits of the to-be-reported CSI, that the format of the PUCCH resource corresponding to the to-be-reported CSI is the first format includes:

if the quantity of bits is less than or equal to a third quantity, determining that the format of the PUCCH resource corresponding to the to-be-reported CSI is the PUCCH format 2; or if the quantity of bits is greater than the third quantity and is less than or equal to a fourth quantity, determining that the format of the PUCCH resource corresponding to the to-be-reported CSI is the PUCCH format 3; or if the quantity of bits is greater than the fourth quantity, determining that the format of the PUCCH resource corresponding to the to-be-reported CSI is the PUCCH format 4.

With reference to any one of the first aspect or the first possible implementation to the sixth possible implementation of the first aspect, in a seventh possible implementation of the first aspect, the adding the to-be-reported CSI to a first first-format PUCCH resource, and reporting the to-be-reported CSI includes:

determining the first PUCCH resource from at least one first-format PUCCH resource corresponding to each of the one or more downlink carrier groups to which the to-be-reported CSI belongs; and adding the to-be-reported CSI to the first PUCCH resource, and reporting the to-be-reported CSI.

With reference to the seventh possible implementation of the first aspect, in an eighth possible implementation of the first aspect, the determining the first PUCCH resource from at least one first-format PUCCH resource corresponding to each of the one or more downlink carrier groups to which the to-be-reported CSI belongs includes:

determining the first PUCCH resource from the at least one PUCCH resource according to received information sent by a network device; or determining, from the at least one PUCCH resource, a smallest-numbered PUCCH resource as the first PUCCH resource; or determining, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

A second aspect of the present invention provides a CSI receiving method, including:

determining CSI that is to be reported by user equipment in an uplink subframe, where the CSI is corresponding to one or more downlink carrier groups, at least two PUCCH resources are configured for one downlink carrier group, and the at least two PUCCH resources have different formats;

determining, according to the CSI, that a format of the PUCCH resource corresponding to the CSI is a first format; and receiving the CSI carried on a first first-format PUCCH resource.

With reference to the second aspect, in a first possible implementation of the second aspect, the at least two PUCCH resources include a PUCCH resource corresponding to a PUCCH format 2 and a PUCCH resource corresponding to a PUCCH format 3; or the at least two PUCCH resources include a PUCCH resource corresponding to a PUCCH format 2 and a PUCCH resource corresponding to a PUCCH format 4; or the at least two PUCCH resources include a PUCCH resource corresponding to a PUCCH format 3 and a PUCCH resource corresponding to a PUCCH format 4; or the at least two PUCCH resources include a PUCCH resource corresponding to a PUCCH format 2, a PUCCH resource corresponding to a PUCCH format 3, and a PUCCH resource corresponding to a PUCCH format 4.

With reference to the first possible implementation of the second aspect, in a second possible implementation of the second aspect, the determining, according to the CSI, that a format of a PUCCH resource corresponding to the CSI is a first format includes:

determining, according to a quantity of carriers corresponding to the CSI, that the format of the PUCCH resource corresponding to the CSI is the first format; or determining, according to a quantity of bits of the CSI, that the format of the PUCCH resource corresponding to the CSI is the first format.

With reference to the second possible implementation of the second aspect, in a third possible implementation of the second aspect, the at least two PUCCH resources include the PUCCH resource corresponding to the PUCCH format 2 and the PUCCH resource corresponding to the PUCCH format 3; and the determining, according to a quantity of carriers corresponding to the CSI, that the format of the PUCCH resource corresponding to the CSI is the first format includes:

if the quantity of carriers is greater than a first quantity, determining that the format of the PUCCH resource corresponding to the CSI is the PUCCH format 3; otherwise, determining that the format of the PUCCH resource corresponding to the CSI is the PUCCH format 2; or the determining, according to a quantity of bits of the CSI, that the format of the PUCCH resource corresponding to the CSI is the first format includes:

if the quantity of bits is greater than a third quantity, determining that the format of the PUCCH resource corresponding to the CSI is the PUCCH format 3; otherwise, determining that the format of the PUCCH resource corresponding to the CSI is the PUCCH format 2.

With reference to the second possible implementation of the second aspect, in a fourth possible implementation of the second aspect, the at least two PUCCH resources include the PUCCH resource corresponding to the PUCCH format 2 and the PUCCH resource corresponding to the PUCCH format 4; and the determining, according to a quantity of carriers corresponding to the CSI, that the format of the PUCCH resource corresponding to the CSI is the first format includes:

if the quantity of carriers is greater than a first quantity, determining that the format of the PUCCH resource corresponding to the CSI is the PUCCH format 4; otherwise, determining that the format of the PUCCH resource corresponding to the CSI is the PUCCH format 2; or the determining, according to a quantity of bits of the CSI, that the format of the PUCCH resource corresponding to the CSI is the first format includes:

if the quantity of bits is greater than a third quantity, determining that the format of the PUCCH resource corresponding to the CSI is the PUCCH format 4; otherwise, determining that the format of the PUCCH resource corresponding to the CSI is the PUCCH format 2.

With reference to the second possible implementation of the second aspect, in a fifth possible implementation of the second aspect, the at least two PUCCH resources include the PUCCH resource corresponding to the PUCCH format 3 and the PUCCH resource corresponding to the PUCCH format 4; and the determining, according to a quantity of carriers corresponding to the CSI, that the format of the PUCCH resource corresponding to the CSI is the first format includes:

if the quantity of carriers is greater than a second quantity, determining that the format of the PUCCH resource corresponding to the CSI is the PUCCH format 4; otherwise, determining that the format of the PUCCH resource corresponding to the CSI is the PUCCH format 3; or the determining, according to a quantity of bits of the CSI, that the format of the PUCCH resource corresponding to the CSI is the first format includes:

if the quantity of bits is greater than a fourth quantity, determining that the format of the PUCCH resource corresponding to the CSI is the PUCCH format 4; otherwise, determining that the format of the PUCCH resource corresponding to the CSI is the PUCCH format 3.

With reference to the second possible implementation of the second aspect, in a sixth possible implementation of the second aspect, the at least two PUCCH resources include the PUCCH resource corresponding to the PUCCH format 2, the PUCCH resource corresponding to the PUCCH format 3, and the PUCCH resource corresponding to the PUCCH format 4; and the determining, according to a quantity of carriers corresponding to the CSI, that the format of the PUCCH resource corresponding to the CSI is the first format includes:

if the quantity of carriers is less than or equal to a first quantity, determining that the format of the PUCCH resource corresponding to the CSI is the PUCCH format 2; or if the quantity of carriers is greater than the first quantity and is less than or equal to a second quantity, determining that the format of the PUCCH resource corresponding to the CSI is the PUCCH format 3; or if the quantity of carriers is greater than the second quantity, determining that the format of the PUCCH resource corresponding to the CSI is the PUCCH format 4; or the determining, according to a quantity of bits of the CSI, that the format of the PUCCH resource corresponding to the CSI is the first format includes:

if the quantity of bits is less than or equal to a third quantity, determining that the format of the PUCCH resource corresponding to the CSI is the PUCCH format 2; or if the quantity of bits is greater than the third quantity and is less than or equal to a fourth quantity, determining that the format of the PUCCH resource corresponding to the CSI is the PUCCH format 3; or if the quantity of bits is greater than the fourth quantity, determining that the format of the PUCCH resource corresponding to the CSI is the PUCCH format 4.

With reference to any one of the second aspect or the first possible implementation to the sixth possible implementation of the second aspect, in a seventh possible implementation of the second aspect, before the receiving the CSI carried on a first first-format PUCCH resource, the method further includes:

determining the first PUCCH resource from at least one first-format PUCCH resource corresponding to each of the one or more downlink carrier groups to which the CSI belongs; and determining to receive the CSI by using the first PUCCH resource.

With reference to the seventh possible implementation of the second aspect, in an eighth possible implementation of the second aspect, the determining the first PUCCH resource from at least one first-format PUCCH resource corresponding to each of the one or more downlink carrier groups to which the CSI belongs includes:

determining the first PUCCH resource from the at least one PUCCH resource according to received information sent by a network device; or determining, from the at least one PUCCH resource, a smallest-numbered PUCCH resource as the first PUCCH resource; or determining, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

A third aspect of the present invention provides user equipment, including:

an obtaining module, configured to obtain CSI that is to be reported in an uplink subframe, where the to-be-reported CSI is corresponding to one or more downlink carrier groups, at least two PUCCH resources are configured for one downlink carrier group, and the at least two PUCCH resources have different formats;

a determining module, configured to determine, according to the to-be-reported CSI, that a format of a PUCCH resource corresponding to the to-be-reported CSI is a first format; and a sending module, configured to add the to-be-reported CSI to a first first-format PUCCH resource, and report the to-be-reported CSI.

With reference to the third aspect, in a first possible implementation of the third aspect, the at least two PUCCH resources include a PUCCH resource corresponding to a PUCCH format 2 and a PUCCH resource corresponding to a PUCCH format 3; or the at least two PUCCH resources include a PUCCH resource corresponding to a PUCCH format 2 and a PUCCH resource corresponding to a PUCCH format 4; or the at least two PUCCH resources include a PUCCH resource corresponding to a PUCCH format 3 and a PUCCH resource corresponding to a PUCCH format 4; or the at least two PUCCH resources include a PUCCH resource corresponding to a PUCCH format 2, a PUCCH resource corresponding to a PUCCH format 3, and a PUCCH resource corresponding to a PUCCH format 4.

With reference to the first possible implementation of the third aspect, in a second possible implementation of the third aspect, the determining module is specifically configured to:

determine, according to a quantity of carriers corresponding to the to-be-reported CSI, that the format of the PUCCH resource corresponding to the to-be-reported CSI is the first format; or determine, according to a quantity of bits of the to-be-reported CSI, that the format of the PUCCH resource corresponding to the to-be-reported CSI is the first format.

With reference to the second possible implementation of the third aspect, in a third possible implementation of the third aspect, the at least two PUCCH resources include the PUCCH resource corresponding to the PUCCH format 2 and the PUCCH resource corresponding to the PUCCH format 3; and that the determining module is specifically configured to determine, according to a quantity of carriers corresponding to the to-be-reported CSI, that the format of the PUCCH resource corresponding to the to-be-reported CSI is the first format is specifically:

if the quantity of carriers is greater than a first quantity, determining that the format of the PUCCH resource corresponding to the to-be-reported CSI is the PUCCH format 3; otherwise, determining that the format of the PUCCH resource corresponding to the to-be-reported CSI is the PUCCH format 2; or that the determining module is specifically configured to determine, according to a quantity of bits of the to-be-reported CSI, that the format of the PUCCH resource corresponding to the to-be-reported CSI is the first format is specifically:

if the quantity of bits is greater than a third quantity, determining that the format of the PUCCH resource corresponding to the to-be-reported CSI is the PUCCH format 3; otherwise, determining that the format of the PUCCH resource corresponding to the to-be-reported CSI is the PUCCH format 2.

With reference to the second possible implementation of the third aspect, in a fourth possible implementation of the third aspect, the at least two PUCCH resources include the PUCCH resource corresponding to the PUCCH format 2 and the PUCCH resource corresponding to the PUCCH format 4; and that the determining module is specifically configured to determine, according to a quantity of carriers corresponding to the to-be-reported CSI, that the format of the PUCCH resource corresponding to the to-be-reported CSI is the first format is specifically:

if the quantity of carriers is greater than a first quantity, determining that the format of the PUCCH resource corresponding to the to-be-reported CSI is the PUCCH format 4; otherwise, determining that the format of the PUCCH resource corresponding to the to-be-reported CSI is the PUCCH format 2; or that the determining module is specifically configured to determine, according to a quantity of bits of the to-be-reported CSI, that the format of the PUCCH resource corresponding to the to-be-reported CSI is the first format is specifically:

if the quantity of bits is greater than a third quantity, determining that the format of the PUCCH resource corresponding to the to-be-reported CSI is the PUCCH format 4; otherwise, determining that the format of the PUCCH resource corresponding to the to-be-reported CSI is the PUCCH format 2.

With reference to the second possible implementation of the third aspect, in a fifth possible implementation of the third aspect, the at least two PUCCH resources include the PUCCH resource corresponding to the PUCCH format 3 and the PUCCH resource corresponding to the PUCCH format 4; and that the determining module is specifically configured to determine, according to a quantity of carriers corresponding to the to-be-reported CSI, that the format of the PUCCH resource corresponding to the to-be-reported CSI is the first format is specifically:

if the quantity of carriers is greater than a second quantity, determining that the format of the PUCCH resource corresponding to the to-be-reported CSI is the PUCCH format 4;

otherwise, determining that the format of the PUCCH resource corresponding to the to-be-reported CSI is the PUCCH format 3; or that the determining module is specifically configured to determine, according to a quantity of bits of the to-be-reported CSI, that the format of the PUCCH resource corresponding to the to-be-reported CSI is the first format is specifically:

if the quantity of bits is greater than a fourth quantity, determining that the format of the PUCCH resource corresponding to the to-be-reported CSI is the PUCCH format 4; otherwise, determining that the format of the PUCCH resource corresponding to the to-be-reported CSI is the PUCCH format 3.

With reference to the second possible implementation of the third aspect, in a sixth possible implementation of the third aspect, the at least two PUCCH resources include the PUCCH resource corresponding to the PUCCH format 2, the PUCCH resource corresponding to the PUCCH format 3, and the PUCCH resource corresponding to the PUCCH format 4; and that the determining module is specifically configured to determine, according to a quantity of carriers corresponding to the to-be-reported CSI, that the format of the PUCCH resource corresponding to the to-be-reported CSI is the first format is specifically:

if the quantity of carriers is less than or equal to a first quantity, determining that the format of the PUCCH resource corresponding to the to-be-reported CSI is the PUCCH format 2; or if the quantity of carriers is greater than the first quantity and is less than or equal to a second quantity, determining that the format of the PUCCH resource corresponding to the to-be-reported CSI is the PUCCH format 3; or if the quantity of carriers is greater than the second quantity, determining that the format of the PUCCH resource corresponding to the to-be-reported CSI is the PUCCH format 4; or that the determining module is specifically configured to determine, according to a quantity of bits of the to-be-reported CSI, that the format of the PUCCH resource corresponding to the to-be-reported CSI is the first format is specifically:

if the quantity of bits is less than or equal to a third quantity, determining that the format of the PUCCH resource corresponding to the to-be-reported CSI is the PUCCH format 2; or if the quantity of bits is greater than the third quantity and is less than or equal to a fourth quantity, determining that the format of the PUCCH resource corresponding to the to-be-reported CSI is the PUCCH format 3; or if the quantity of bits is greater than the fourth quantity, determining that the format of the PUCCH resource corresponding to the to-be-reported CSI is the PUCCH format 4.

With reference to any one of the third aspect or the first possible implementation to the sixth possible implementation of the third aspect, in a seventh possible implementation of the third aspect, the sending module is specifically configured to:

determine the first PUCCH resource from at least one first-format PUCCH resource corresponding to each of the one or more downlink carrier groups to which the to-be-reported CSI belongs; and add the to-be-reported CSI to the first PUCCH resource, and report the to-be-reported CSI.

With reference to the seventh possible implementation of the third aspect, in an eighth possible implementation of the third aspect, that the sending module is specifically configured to determine the first PUCCH resource from at least one first-format PUCCH resource corresponding to each of the one or more downlink carrier groups to which the to-be-reported CSI belongs is specifically:

determining the first PUCCH resource from the at least one PUCCH resource according to received information sent by a network device; or determining, from the at least one PUCCH resource, a smallest-numbered PUCCH resource as the first PUCCH resource; or determining, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

A fourth aspect of the present invention provides a network device, including:

a first determining module, configured to determine channel state information CSI that is to be reported by user equipment in an uplink subframe, where the CSI is corresponding to one or more downlink carrier groups, at least two physical uplink control channel PUCCH resources are configured for one downlink carrier group, and the at least two PUCCH resources have different formats;

a second determining module, configured to determine, according to the CSI, that a format of a PUCCH resource corresponding to the CSI is a first format; and a receiving module, configured to receive the CSI carried on a first first-format PUCCH resource.

With reference to the fourth aspect, in a first possible implementation of the fourth aspect, the at least two PUCCH resources include a PUCCH resource corresponding to a PUCCH format 2 and a PUCCH resource corresponding to a PUCCH format 3; or the at least two PUCCH resources include a PUCCH resource corresponding to a PUCCH format 2 and a PUCCH resource corresponding to a PUCCH format 4; or the at least two PUCCH resources include a PUCCH resource corresponding to a PUCCH format 3 and a PUCCH resource corresponding to a PUCCH format 4; or the at least two PUCCH resources include a PUCCH resource corresponding to a PUCCH format 2, a PUCCH resource corresponding to a PUCCH format 3, and a PUCCH resource corresponding to a PUCCH format 4.

With reference to the first possible implementation of the fourth aspect, in a second possible implementation of the fourth aspect, the second determining module is specifically configured to:

determine, according to a quantity of carriers corresponding to the CSI, that the format of the PUCCH resource corresponding to the CSI is the first format; or determine, according to a quantity of bits of the CSI, that the format of the PUCCH resource corresponding to the CSI is the first format.

With reference to the second possible implementation of the fourth aspect, in a third possible implementation of the fourth aspect, the at least two PUCCH resources include the PUCCH resource corresponding to the PUCCH format 2 and the PUCCH resource corresponding to the PUCCH format 3; and that the second determining module is specifically configured to determine, according to a quantity of carriers corresponding to the CSI, that the format of the PUCCH resource corresponding to the CSI is the first format is specifically:

if the quantity of carriers is greater than a first quantity, determining that the format of the PUCCH resource corresponding to the CSI is the PUCCH format 3; otherwise, determining that the format of the PUCCH resource corresponding to the CSI is the PUCCH format 2; or that the second determining module is specifically configured to determine, according to a quantity of bits of the CSI, that the format of the PUCCH resource corresponding to the CSI is the first format is specifically:

if the quantity of bits is greater than a third quantity, determining that the format of the PUCCH resource corresponding to the CSI is the PUCCH format 3; otherwise, determining that the format of the PUCCH resource corresponding to the CSI is the PUCCH format 2.

With reference to the second possible implementation of the fourth aspect, in a fourth possible implementation of the fourth aspect, the at least two PUCCH resources include the PUCCH resource corresponding to the PUCCH format 2 and the PUCCH resource corresponding to the PUCCH format 4; and that the second determining module is specifically configured to determine, according to a quantity of carriers corresponding to the CSI, that the format of the PUCCH resource corresponding to the CSI is the first format is specifically:

if the quantity of carriers is greater than a first quantity, determining that the format of the PUCCH resource corresponding to the CSI is the PUCCH format 4; otherwise, determining that the format of the PUCCH resource corresponding to the CSI is the PUCCH format 2; or that the second determining module is specifically configured to determine, according to a quantity of bits of the CSI, that the format of the PUCCH resource corresponding to the CSI is the first format is specifically:

if the quantity of bits is greater than a third quantity, determining that the format of the PUCCH resource corresponding to the CSI is the PUCCH format 4; otherwise, determining that the format of the PUCCH resource corresponding to the CSI is the PUCCH format 2.

With reference to the second possible implementation of the fourth aspect, in a fifth possible implementation of the fourth aspect, the at least two PUCCH resources include the PUCCH resource corresponding to the PUCCH format 3 and the PUCCH resource corresponding to the PUCCH format 4; and that the second determining module is specifically configured to determine, according to a quantity of carriers corresponding to the CSI, that the format of the PUCCH resource corresponding to the CSI is the first format is specifically:

if the quantity of carriers is greater than a second quantity, determining that the format of the PUCCH resource corresponding to the CSI is the PUCCH format 4; otherwise, determining that the format of the PUCCH resource corresponding to the CSI is the PUCCH format 3; or that the second determining module is specifically configured to determine, according to a quantity of bits of the CSI, that the format of the PUCCH resource corresponding to the CSI is the first format is specifically:

if the quantity of bits is greater than a fourth quantity, determining that the format of the PUCCH resource corresponding to the CSI is the PUCCH format 4; otherwise, determining that the format of the PUCCH resource corresponding to the CSI is the PUCCH format 3.

With reference to the second possible implementation of the fourth aspect, in a sixth possible implementation of the fourth aspect, the at least two PUCCH resources include the PUCCH resource corresponding to the PUCCH format 2, the PUCCH resource corresponding to the PUCCH format 3, and the PUCCH resource corresponding to the PUCCH format 4; and that the second determining module is specifically configured to determine, according to a quantity of carriers corresponding to the CSI, that the format of the PUCCH resource corresponding to the CSI is the first format is specifically:

if the quantity of carriers is less than or equal to a first quantity, determining that the format of the PUCCH resource corresponding to the CSI is the PUCCH format 2; or if the quantity of carriers is greater than the first quantity and is less than or equal to a second quantity, determining that the format of the PUCCH resource corresponding to the CSI is the PUCCH format 3; or if the quantity of carriers is greater than the second quantity, determining that the format of the PUCCH resource corresponding to the CSI is the PUCCH format 4; or that the second determining module is specifically configured to determine, according to a quantity of bits of the CSI, that the format of the PUCCH resource corresponding to the CSI is the first format is specifically:

if the quantity of bits is less than or equal to a third quantity, determining that the format of the PUCCH resource corresponding to the CSI is the PUCCH format 2; or if the quantity of bits is greater than the third quantity and is less than or equal to a fourth quantity, determining that the format of the PUCCH resource corresponding to the CSI is the PUCCH format 3; or if the quantity of bits is greater than the fourth quantity, determining that the format of the PUCCH resource corresponding to the CSI is the PUCCH format 4.

With reference to any one of the fourth aspect or the first possible implementation to the sixth possible implementation of the fourth aspect, in a seventh possible implementation of the fourth aspect, the network device further includes a third determining module and a fourth determining module, where the third determining module is configured to: before the receiving module receives the CSI carried on a first first-format PUCCH resource, determine the first PUCCH resource from at least one first-format PUCCH resource corresponding to each of the one or more downlink carrier groups to which the CSI belongs; and the fourth determining module is configured to determine to receive the CSI by using the first PUCCH resource.

With reference to the seventh possible implementation of the fourth aspect, in an eighth possible implementation of the fourth aspect, the third determining module is specifically configured to:

determine the first PUCCH resource from the at least one PUCCH resource according to received information sent by the network device; or determine, from the at least one PUCCH resource, a smallest-numbered PUCCH resource as the first PUCCH resource; or determine, from the at least one PUCCH resource, a largest-numbered PUCCH resource as the first PUCCH resource; or determine, from at least one carrier corresponding to the at least one PUCCH resource, a PUCCH resource corresponding to a smallest-numbered carrier as the first PUCCH resource; or determine, from at least one carrier corresponding to the at least one PUCCH resource, a PUCCH resource corresponding to a largest-numbered carrier as the first PUCCH resource.

A fifth aspect of the present invention provides user equipment, including a memory, a processor, and a transceiver that are connected to a same bus, where the memory is configured to store an instruction; and the processor is configured to: execute the instruction, to obtain CSI that is to be reported in an uplink subframe, where the to-be-reported CSI is corresponding to one or more downlink carrier groups, at least two PUCCH resources are configured for one downlink carrier group, and the at least two PUCCH resources have different formats; determine, according to the to-be-reported CSI, that a format of a PUCCH resource corresponding to the to-be-reported CSI is a first format; and add the to-be-reported CSI to a first first-format PUCCH resource, and report the to-be-reported CSI by using the transceiver.

With reference to the fifth aspect, in a first possible implementation of the fifth aspect, the at least two PUCCH resources include a PUCCH resource corresponding to a PUCCH format 2 and a PUCCH resource corresponding to a PUCCH format 3; or the at least two PUCCH resources include a PUCCH resource corresponding to a PUCCH format 2 and a PUCCH resource corresponding to a PUCCH format 4; or the at least two PUCCH resources include a PUCCH resource corresponding to a PUCCH format 3 and a PUCCH resource corresponding to a PUCCH format 4; or the at least two PUCCH resources include a PUCCH resource corresponding to a PUCCH format 2, a PUCCH resource corresponding to a PUCCH format 3, and a PUCCH resource corresponding to a PUCCH format 4.

With reference to the first possible implementation of the fifth aspect, in a second possible implementation of the fifth aspect, that the processor is configured to determine, according to the to-be-reported CSI, that a format of a PUCCH resource corresponding to the to-be-reported CSI is a first format is specifically:

determining, according to a quantity of carriers corresponding to the to-be-reported CSI, that the format of the PUCCH resource corresponding to the to-be-reported CSI is the first format; or determining, according to a quantity of bits of the to-be-reported CSI, that the format of the PUCCH resource corresponding to the to-be-reported CSI is the first format.

With reference to the second possible implementation of the fifth aspect, in a third possible implementation of the fifth aspect, the at least two PUCCH resources include the PUCCH resource corresponding to the PUCCH format 2 and the PUCCH resource corresponding to the PUCCH format 3; and that the processor is specifically configured to determine, according to a quantity of carriers corresponding to the to-be-reported CSI, that the format of the PUCCH resource corresponding to the to-be-reported CSI is the first format is specifically:

if the quantity of carriers is greater than a first quantity, determining that the format of the PUCCH resource corresponding to the to-be-reported CSI is the PUCCH format 3; otherwise, determining that the format of the PUCCH resource corresponding to the to-be-reported CSI is the PUCCH format 2; or that the processor is specifically configured to determine, according to a quantity of bits of the to-be-reported CSI, that the format of the PUCCH resource corresponding to the to-be-reported CSI is the first format is specifically:

if the quantity of bits is greater than a third quantity, determining that the format of the PUCCH resource corresponding to the to-be-reported CSI is the PUCCH format 3; otherwise, determining that the format of the PUCCH resource corresponding to the to-be-reported CSI is the PUCCH format 2.

With reference to the second possible implementation of the fifth aspect, in a fourth possible implementation of the fifth aspect, the at least two PUCCH resources include the PUCCH resource corresponding to the PUCCH format 2 and the PUCCH resource corresponding to the PUCCH format 4; and that the processor is specifically configured to determine, according to a quantity of carriers corresponding to the to-be-reported CSI, that the format of the PUCCH resource corresponding to the to-be-reported CSI is the first format is specifically:

if the quantity of carriers is greater than a first quantity, determining that the format of the PUCCH resource corresponding to the to-be-reported CSI is the PUCCH format 4; otherwise, determining that the format of the PUCCH resource corresponding to the to-be-reported CSI is the PUCCH format 2; or that the processor is specifically configured to determine, according to a quantity of bits of the to-be-reported CSI, that the format of the PUCCH resource corresponding to the to-be-reported CSI is the first format is specifically:

if the quantity of bits is greater than a third quantity, determining that the format of the PUCCH resource corresponding to the to-be-reported CSI is the PUCCH format 4; otherwise, determining that the format of the PUCCH resource corresponding to the to-be-reported CSI is the PUCCH format 2.

With reference to the second possible implementation of the fifth aspect, in a fifth possible implementation of the fifth aspect, the at least two PUCCH resources include the PUCCH resource corresponding to the PUCCH format 3 and the PUCCH resource corresponding to the PUCCH format 4; and that the processor is specifically configured to determine, according to a quantity of carriers corresponding to the to-be-reported CSI, that the format of the PUCCH resource corresponding to the to-be-reported CSI is the first format is specifically:

if the quantity of carriers is greater than a second quantity, determining that the format of the PUCCH resource corresponding to the to-be-reported CSI is the PUCCH format 4; otherwise, determining that the format of the PUCCH resource corresponding to the to-be-reported CSI is the PUCCH format 3; or that the processor is specifically configured to determine, according to a quantity of bits of the to-be-reported CSI, that the format of the PUCCH resource corresponding to the to-be-reported CSI is the first format is specifically:

if the quantity of bits is greater than a fourth quantity, determining that the format of the PUCCH resource corresponding to the to-be-reported CSI is the PUCCH format 4;

otherwise, determining that the format of the PUCCH resource corresponding to the to-be-reported CSI is the PUCCH format 3.

With reference to the second possible implementation of the fifth aspect, in a sixth possible implementation of the fifth aspect, the at least two PUCCH resources include the PUCCH resource corresponding to the PUCCH format 2, the PUCCH resource corresponding to the PUCCH format 3, and the PUCCH resource corresponding to the PUCCH format 4; and that the processor is specifically configured to determine, according to a quantity of carriers corresponding to the to-be-reported CSI, that the format of the PUCCH resource corresponding to the to-be-reported CSI is the first format is specifically:

if the quantity of carriers is less than or equal to a first quantity, determining that the format of the PUCCH resource corresponding to the to-be-reported CSI is the PUCCH format 2; or if the quantity of carriers is greater than the first quantity and is less than or equal to a second quantity, determining that the format of the PUCCH resource corresponding to the to-be-reported CSI is the PUCCH format 3; or if the quantity of carriers is greater than the second quantity, determining that the format of the PUCCH resource corresponding to the to-be-reported CSI is the PUCCH format 4; or that the processor is specifically configured to determine, according to a quantity of bits of the to-be-reported CSI, that the format of the PUCCH resource corresponding to the to-be-reported CSI is the first format is specifically:

if the quantity of bits is less than or equal to a third quantity, determining that the format of the PUCCH resource corresponding to the to-be-reported CSI is the PUCCH format 2; or if the quantity of bits is greater than the third quantity and is less than or equal to a fourth quantity, determining that the format of the PUCCH resource corresponding to the to-be-reported CSI is the PUCCH format 3; or if the quantity of bits is greater than the fourth quantity, determining that the format of the PUCCH resource corresponding to the to-be-reported CSI is the PUCCH format 4.

With reference to any one of the fifth aspect or the first possible implementation to the sixth possible implementation of the fifth aspect, in a seventh possible implementation of the fifth aspect, that the processor is configured to add the to-be-reported CSI to a first first-format PUCCH resource, and report the to-be-reported CSI by using the transceiver is specifically:

determining the first PUCCH resource from at least one first-format PUCCH resource corresponding to each of the one or more downlink carrier groups to which the to-be-reported CSI belongs; and adding the to-be-reported CSI to the first PUCCH resource, and reporting the to-be-reported CSI by using the transceiver.

With reference to the seventh possible implementation of the fifth aspect, in an eighth possible implementation of the fifth aspect, that the processor is specifically configured to determine the first PUCCH resource from at least one first-format PUCCH resource corresponding to each of the one or more downlink carrier groups to which the to-be-reported CSI belongs is specifically:

determining the first PUCCH resource from the at least one PUCCH resource according to information that is sent by a network device and that is received by the transceiver; or determining, from the at least one PUCCH resource, a smallest-numbered PUCCH resource as the first PUCCH resource; or determining, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

A sixth aspect of the present invention provides a network device, including a memory, a processor, and a receiver that are connected to a same bus, where the memory is configured to store an instruction;

the processor is configured to: execute the instruction, to determine CSI that is to be reported by user equipment in an uplink subframe, where the CSI is corresponding to one or more downlink carrier groups, at least two PUCCH resources are configured for one downlink carrier group, and the at least two PUCCH resources have different formats; and determine, according to the CSI, that a format of a PUCCH resource corresponding to the CSI is a first format; and the receiver is configured to receive the CSI carried on a first first-format PUCCH resource.

With reference to the sixth aspect, in a first possible implementation of the sixth aspect, the at least two PUCCH resources include a PUCCH resource corresponding to a PUCCH format 2 and a PUCCH resource corresponding to a PUCCH format 3; or the at least two PUCCH resources include a PUCCH resource corresponding to a PUCCH format 2 and a PUCCH resource corresponding to a PUCCH format 4; or the at least two PUCCH resources include a PUCCH resource corresponding to a PUCCH format 3 and a PUCCH resource corresponding to a PUCCH format 4; or the at least two PUCCH resources include a PUCCH resource corresponding to a PUCCH format 2, a PUCCH resource corresponding to a PUCCH format 3, and a PUCCH resource corresponding to a PUCCH format 4.

With reference to the first possible implementation of the sixth aspect, in a second possible implementation of the sixth aspect, that the processor is configured to determine, according to the CSI, that a format of a PUCCH resource corresponding to the CSI is a first format is specifically:

determining, according to a quantity of carriers corresponding to the CSI, that the format of the PUCCH resource corresponding to the CSI is the first format; or determining, according to a quantity of bits of the CSI, that the format of the PUCCH resource corresponding to the CSI is the first format.

With reference to the second possible implementation of the sixth aspect, in a third possible implementation of the sixth aspect, the at least two PUCCH resources include the PUCCH resource corresponding to the PUCCH format 2 and the PUCCH resource corresponding to the PUCCH format 3; and that the processor is specifically configured to determine, according to a quantity of carriers corresponding to the CSI, that the format of the PUCCH resource corresponding to the CSI is the first format is specifically:

if the quantity of carriers is greater than a first quantity, determining that the format of the PUCCH resource corresponding to the CSI is the PUCCH format 3; otherwise, determining that the format of the PUCCH resource corresponding to the CSI is the PUCCH format 2; or that the processor is specifically configured to determine, according to a quantity of bits of the CSI, that the format of the PUCCH resource corresponding to the CSI is the first format is specifically:

if the quantity of bits is greater than a third quantity, determining that the format of the PUCCH resource corresponding to the CSI is the PUCCH format 3; otherwise, determining that the format of the PUCCH resource corresponding to the CSI is the PUCCH format 2.

With reference to the second possible implementation of the sixth aspect, in a fourth possible implementation of the sixth aspect, the at least two PUCCH resources include the PUCCH resource corresponding to the PUCCH format 2 and the PUCCH resource corresponding to the PUCCH format 4; and that the processor is specifically configured to determine, according to a quantity of carriers corresponding to the CSI, that the format of the PUCCH resource corresponding to the CSI is the first format is specifically:

if the quantity of carriers is greater than a first quantity, determining that the format of the PUCCH resource corresponding to the CSI is the PUCCH format 4; otherwise, determining that the format of the PUCCH resource corresponding to the CSI is the PUCCH format 2; or that the processor is specifically configured to determine, according to a quantity of bits of the CSI, that the format of the PUCCH resource corresponding to the CSI is the first format is specifically:

if the quantity of bits is greater than a third quantity, determining that the format of the PUCCH resource corresponding to the CSI is the PUCCH format 4; otherwise, determining that the format of the PUCCH resource corresponding to the CSI is the PUCCH format 2.

With reference to the second possible implementation of the sixth aspect, in a fifth possible implementation of the sixth aspect, the at least two PUCCH resources include the PUCCH resource corresponding to the PUCCH format 3 and the PUCCH resource corresponding to the PUCCH format 4; and that the processor is specifically configured to determine, according to a quantity of carriers corresponding to the CSI, that the format of the PUCCH resource corresponding to the CSI is the first format is specifically:

if the quantity of carriers is greater than a second quantity, determining that the format of the PUCCH resource corresponding to the CSI is the PUCCH format 4; otherwise, determining that the format of the PUCCH resource corresponding to the CSI is the PUCCH format 3; or that the processor is specifically configured to determine, according to a quantity of bits of the CSI, that the format of the PUCCH resource corresponding to the CSI is the first format is specifically:

if the quantity of bits is greater than a fourth quantity, determining that the format of the PUCCH resource corresponding to the CSI is the PUCCH format 4; otherwise, determining that the format of the PUCCH resource corresponding to the CSI is the PUCCH format 3.

With reference to the second possible implementation of the sixth aspect, in a sixth possible implementation of the sixth aspect, the at least two PUCCH resources include the PUCCH resource corresponding to the PUCCH format 2, the PUCCH resource corresponding to the PUCCH format 3, and the PUCCH resource corresponding to the PUCCH format 4; and that the processor is specifically configured to determine, according to a quantity of carriers corresponding to the CSI, that the format of the PUCCH resource corresponding to the CSI is the first format is specifically:

if the quantity of carriers is less than or equal to a first quantity, determining that the format of the PUCCH resource corresponding to the CSI is the PUCCH format 2; or if the quantity of carriers is greater than the first quantity and is less than or equal to a second quantity, determining that the format of the PUCCH resource corresponding to the CSI is the PUCCH format 3; or if the quantity of carriers is greater than the second quantity, determining that the format of the PUCCH resource corresponding to the CSI is the PUCCH format 4; or that the processor is specifically configured to determine, according to a quantity of bits of the CSI, that the format of the PUCCH resource corresponding to the CSI is the first format is specifically:

if the quantity of bits is less than or equal to a third quantity, determining that the format of the PUCCH resource corresponding to the CSI is the PUCCH format 2; or if the quantity of bits is greater than the third quantity and is less than or equal to a fourth quantity, determining that the format of the PUCCH resource corresponding to the CSI is the PUCCH format 3; or if the quantity of bits is greater than the fourth quantity, determining that the format of the PUCCH resource corresponding to the CSI is the PUCCH format 4.

With reference to any one of the sixth aspect or the first possible implementation to the sixth possible implementation of the sixth aspect, in a seventh possible implementation of the sixth aspect, the processor is further configured to:

before the receiver receives the CSI carried on a first first-format PUCCH resource, determine the first PUCCH resource from at least one first-format PUCCH resource corresponding to each of the one or more downlink carrier groups to which the CSI belongs; and determine to receive the CSI by using the first PUCCH resource.

With reference to the seventh possible implementation of the sixth aspect, in an eighth possible implementation of the sixth aspect, that the processor is specifically configured to determine the first PUCCH resource from at least one first-format PUCCH resource corresponding to each of the one or more downlink carrier groups to which the CSI belongs is specifically:

determining the first PUCCH resource from the at least one PUCCH resource according to received information sent by the network device; or determining, from the at least one PUCCH resource, a smallest-numbered PUCCH resource as the first PUCCH resource; or determining, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

In the embodiments of the present invention, at least two PUCCH resources are configured for each downlink carrier group. CSI that needs to be reported in one uplink subframe may be obtained, and a format of a corresponding PUCCH resource is determined according to the to-be-reported CSI. For example, the determined format is referred to as a first format. Then, all of the to-be-reported CSI is reported after being added to a first first-format PUCCH resource. Therefore, in the embodiments of the present invention, the CSI that needs to be reported in one uplink subframe may be reported by occupying only one PUCCH resource. This greatly reduces PUCCH resource overheads and improves a throughput of an uplink system compared with a prior-art solution that each CSI needs to occupy one PUCCH resource.

Moreover, in the prior art, if CSI of different carriers needs to be reported in one uplink subframe, only one piece of CSI can be selected for reporting, and other non-selected CSI is discarded. That is, CSI corresponding to some carriers cannot be reported, and a base station cannot perform effective downlink data scheduling for a downlink carrier corresponding to the unreported CSI. This causes performance deterioration of a downlink system. However, after the technical solutions in the embodiments of the present invention are used, CSI that needs to be reported in one uplink subframe can be reported after being added to a same PUCCH resource. This avoids, as far as possible, discarding CSI, and ensures that CSI of all downlink carriers that needs to be reported can be reported, so that a base station can relatively effectively schedule the downlink carriers, thereby improving performance of the downlink system.

DESCRIPTION OF EMBODIMENTS

Figure 1:
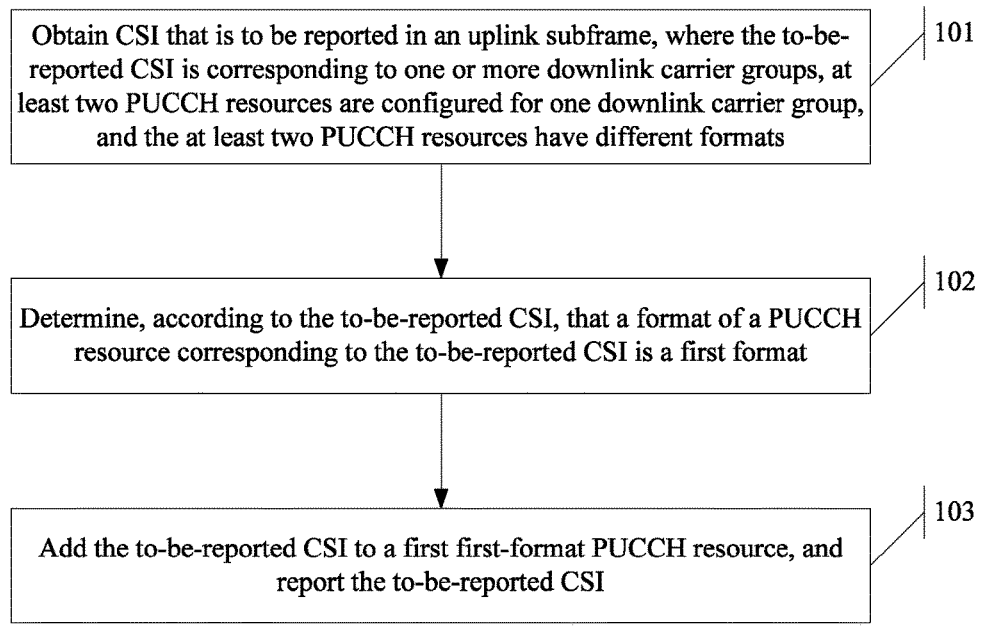
FIG. 1 is a main flowchart of a CSI reporting method according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Technologies described in this specification can be used in an LTE-A system and a subsequent evolved system of LTE-A.

In the embodiments of the present invention, a PUCCH resource corresponding to a PUCCH format (format) 2 generally supports 11 bits (bit), and a PUCCH resource corresponding to a PUCCH format 3 generally supports 22 bits. A new PUCCH format may be introduced to the LTE R13, and the new PUCCH format is referred to as a PUCCH format 4 in the embodiments of the present invention. A PUCCH resource corresponding to a PUCCH format 4 can support a maximum of 128 bits or even up to 320 bits. Certainly, if a PUCCH resource in another format is proposed in a subsequent LTE release, methods in the embodiments of the present invention can also be naturally applied to a new PUCCH resource. A person skilled in the art naturally knows how to use the methods in the embodiments of the present invention in practice, and make corresponding variations.

In the embodiments of the present invention, CSI is periodic CSI, that is, CSI that needs to be periodically reported. A maximum quantity of bits of each piece of CSI is generally 11.

In the LTE-A system, an eNB (evolved base station) configures or reconfigures, by using semi-static RRC (radio resource control) signaling, a schedulable carrier set for LTE-A UE (user equipment) having a CA capability. Generally, a carrier set configured for UE is referred to as a UE DL CC set (user equipment downlink component carrier set). A UE DL CC set corresponding to UE may include one or more downlink carrier groups, and one carrier group may include one or more downlink carriers. For convenience, a downlink carrier is referred to as a carrier for short in the embodiments of the present invention.

In addition, for power saving, a carrier activation (that is, enabling) and deactivation (that is, disabling) mechanism is further introduced based on the semi-statically configured UE DL CC set. Except a downlink primary component carrier, all other component carriers may be activated or deactivated according to a service requirement. Generally, except the downlink primary component carrier, each newly configured downlink component carrier in the UE DL CC set may be in a deactivated state by default. If a current service rate of UE increases, the eNB may activate one or more carriers that are not activated in the UE DL CC set to perform data transmission. If the current service rate of the UE decreases, the eNB may deactivate one or more activated carriers in the UE DL CC set except the downlink primary component carrier.

An example is used for description. It is assumed that an eNB configures two carriers CC1 and CC2 for a UE DL CC set of UE according to an average service volume of the UE or a capability of the UE. CC1 is a downlink primary component carrier of the UE. Within a period of time, a data transmission rate of the UE increases, the eNB may instruct, by sending activation signaling to the UE, the UE to enable CC2 in a deactivated state, so that CC2 and CC1 perform data transmission in parallel. Then, if the data transmission rate of the UE decreases, the eNB may instruct, by sending deactivation signaling to the UE, the UE to disable the activated CC2.

It should be noted that, in an existing LTE system, a carrier is referred to as a serving cell. That is, a carrier in the embodiments of the present invention is referred to as a serving cell.

The embodiments of the present invention are described with reference to a network device and UE.

The network device is, for example, a base station (for example, an access point), and may be specifically a device that communicates with a wireless terminal in an access network over an air interface by using one or more sectors. The base station may be configured to perform mutual conversion between a received over-the-air frame and an IP packet, and serve as a router between the wireless terminal and the rest portion of the access network. The rest portion of the access network may include an Internet Protocol (IP) network. The base station may further coordinate attribute management of the air interface. For example, the base station may be an evolved base station (NodeB, eNB, or e-NodeB, evolved Node B) in LTE-A. This is not limited in the present invention.

UE may be a wireless terminal or a wired terminal. The wireless terminal may be a device that provides voice and/or data connectivity for a user, a handheld device having a wireless connection function, or another processing device connected to a wireless modem. The wireless terminal may communicate with one or more core networks through a radio access network (for example, RAN (Radio Access Network)). The wireless terminal may be a mobile terminal, such as a mobile phone (also be referred to as a "cellular" phone), and a computer having a mobile terminal, such as a portable, pocket-sized, handheld, computer built-in, or in-vehicle mobile apparatus, which exchanges voice and/or data with the radio access network. For example, the wireless terminal may be a device such as a PCS (personal communication service) phone, a cordless telephone set, a SIP (Session Initiation Protocol) phone, a WLL (wireless local loop) station, or a PDA (personal digital assistant). The wireless terminal may also be referred to as a system, a subscriber unit (Subscriber Unit), a subscriber station, a mobile station, a mobile, a remote station, an access point, a remote terminal, an access terminal, a user terminal, a user agent, a user device, or user equipment.

In addition, the terms "system" and "network" can usually be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects unless otherwise specified.

In the following, the embodiments of the present invention are further described in detail with reference to the accompanying drawings of this specification.

Referring to FIG. 1, an embodiment of the present invention provides a CSI reporting method. The method can be applied to UE. Main procedures of the method are described as follows.

Step 101. Obtain CSI that is to be reported in an uplink subframe, where the to-be-reported CSI is corresponding to one or more downlink carrier groups, at least two PUCCH resources are configured for one downlink carrier group, and the at least two PUCCH resources have different formats.

In this embodiment of the present invention, UE having a CA capability may be corresponding to one or more downlink carrier groups. It may be determined that CSI corresponding to which carriers in each downlink carrier group corresponding to the UE needs to be reported in a same uplink subframe.

For example, if the UE is corresponding to three downlink carrier groups: CG1, CG2, and CG3. There are two carriers in CG1: C1 and C2. There is only one carrier in CG2: C3. There are three carriers in CG3: C4, C5, and C6.

For example, the UE determines that CSI of C1, C3, and C4 in the three downlink carrier groups needs to be reported in a same uplink subframe. It is equivalent to that the CSI that is to be reported by the UE is corresponding to multiple downlink carrier groups.

Alternatively, for example, the UE determines that CSI of C1 and C4 in the three downlink carrier groups needs to be reported in a same uplink subframe. It is equivalent to that the CSI that is to be reported by the UE is corresponding to multiple downlink carrier groups.

Alternatively, for example, the UE determines that CSI of C4 and C5 in the three downlink carrier groups needs to be reported in a same uplink subframe. It is equivalent to that the CSI that is to be reported by the UE is corresponding to one carrier group.

Optionally, in this embodiment of the present invention, before the obtaining CSI that is to be reported in an uplink subframe, the method further includes:

receiving PUCCH resources configured by a network device for each downlink carrier group corresponding to the UE, where the network device configures at least two PUCCH resources for each downlink carrier group corresponding to the UE.

Optionally, in this embodiment of the present invention, in the at least two PUCCH resources configured by the network device for each downlink carrier group of the UE, a capacity of each PUCCH resource may be greater than or equal to a specific capacity. The specific capacity may be, for example, 11 bits, or certainly, may be another value.

Optionally, in this embodiment of the present invention,
the at least two PUCCH resources include a PUCCH resource corresponding to a PUCCH format 2 and a PUCCH resource corresponding to a PUCCH format 3; or
the at least two PUCCH resources include a PUCCH resource corresponding to a PUCCH format 2 and a PUCCH resource corresponding to a PUCCH format 4; or
the at least two PUCCH resources include a PUCCH resource corresponding to a PUCCH format 3 and a PUCCH resource corresponding to a PUCCH format 4; or
the at least two PUCCH resources include a PUCCH resource corresponding to a PUCCH format 2, a PUCCH resource corresponding to a PUCCH format 3, and a PUCCH resource corresponding to a PUCCH format 4.

In this embodiment of the present invention, the method may further include:

receiving an activation instruction or a deactivation instruction sent by the network device; and if the activation instruction is received, activating a corresponding carrier in a downlink carrier group of the UE according to the activation instruction; or if the deactivation instruction is received, disabling a corresponding carrier in a downlink carrier group of the UE according to the deactivation instruction.

In this embodiment of the present invention, the network device sends an activation instruction or a deactivation instruction to the UE, and the network device configures PUCCH resources for a downlink carrier group of the UE. An implementation sequence between sending an activation instruction or a deactivation instruction by the network device to the UE and configuring PUCCH resources for a downlink carrier group of the UE by the network device may be at random.

Certainly, only a carrier in an activated state may be used for reporting CSI, and a carrier in a disabled state does not need to be used for reporting CSI. That is, all carriers corresponding to the to-be-reported CSI that is obtained by the UE are in an activated state.

Step 102. Determine, according to the to-be-reported CSI, that a format of a PUCCH resource corresponding to the to-be-reported CSI is a first format.

Specifically, the format of the PUCCH resource corresponding to the to-be-reported CSI may be determined according to a value of a specific parameter corresponding to the to-be-reported CSI. For example, the determined format is referred to as the first format.

Specifically, a correspondence between a value of a specific parameter corresponding to CSI and a format of a PUCCH resource may be pre-stored in the UE. The specific parameter corresponding to the CSI may be a quantity of carriers corresponding to the CSI, a quantity of bits corresponding to the CSI, or the like. This is not limited in the present invention. A person skilled in the art naturally knows that the correspondence may have corresponding variations when the specific parameter corresponding to the CSI varies.

Optionally, when the specific parameter corresponding to the CSI varies, the UE determines the format of the PUCCH resource corresponding to the to-be-reported CSI in a different manner. Descriptions are separately provided as follows.

1. The specific parameter corresponding to the CSI refers to a quantity of carriers corresponding to the CSI.

Optionally, in this embodiment of the present invention, the determining, according to the to-be-reported CSI, that a format of a PUCCH resource corresponding to the to-be-reported CSI is a first format includes:

determining, according to a quantity of carriers corresponding to the to-be-reported CSI, that the format of the PUCCH resource corresponding to the to-be-reported CSI is the first format.

Specifically, if the specific parameter corresponding to the CSI refers to the quantity of carriers corresponding to the CSI, a correspondence between a value of the specific parameter corresponding to the CSI and the format of the PUCCH resource may be a correspondence between a range of the quantity of carriers corresponding to the CSI and the format of the PUCCH resource.

Optionally, if the at least two PUCCH resources include the PUCCH resource corresponding to the PUCCH format 2 and the PUCCH resource corresponding to the PUCCH format 3, the determining, according to a quantity of carriers corresponding to the to-be-reported CSI, that the format of the PUCCH resource corresponding to the to-be-reported CSI is the first format includes:

if the quantity of carriers is greater than a first quantity, determining that the format of the PUCCH resource corresponding to the to-be-reported CSI is the PUCCH format 3; otherwise, determining that the format of the PUCCH resource corresponding to the to-be-reported CSI is the PUCCH format 2.

In this embodiment of the present invention, for example, the first quantity is 1. A capacity of the PUCCH resource corresponding to the PUCCH format 2 is 11 bits, a capacity of the PUCCH resource corresponding to the PUCCH format 3 is 22 bits, and one piece of CSI generally occupies 11 bits. Therefore, if the total quantity of carriers corresponding to the to-be-reported CSI is greater than 1, it indicates that a quantity of the to-be-reported CSI is greater than 1 (generally, one carrier is corresponding to one piece of CSI). Apparently, the PUCCH resource corresponding to the PUCCH format 2 cannot be used for transmitting all of the to-be-reported CSI. Therefore, in this case, the PUCCH resource corresponding to the PUCCH format 3 may be selected for transmitting the to-be-reported CSI, to ensure, as far as possible, that all of the CSI that needs to be reported in a same uplink subframe can be transmitted. Alternatively, if the total quantity of carriers corresponding to the to-be-reported CSI is less than or equal to 1, the PUCCH resource corresponding to the PUCCH format 2 can be used for transmitting all the obtained CSI. In this case, there is no need to select a larger-capacity PUCCH resource corresponding to the PUCCH format 3, thereby saving network resources as far as possible.

In this embodiment of the present invention, at least two PUCCH resources are configured for each downlink carrier group. For example, a PUCCH-format-2 PUCCH resource and a PUCCH-format-3 PUCCH resource are configured for each downlink carrier group. PUCCH-format-2 PUCCH resources configured for different downlink carrier groups may be the same or different. Similarly, PUCCH-format-3 PUCCH resources configured for different downlink carrier groups may be the same or different. For example, it is determined that CSI of K activated carriers needs to be reported in an uplink subframe n, and K pieces of CSI are corresponding to K downlink carrier groups. Then, K PUCCH-format-2 PUCCH resources may be available for selection. That is, the UE needs to determine one PUCCH resource from the K PUCCH-format-2 PUCCH resources to transmit the K pieces of CSI.

When determining the PUCCH resource, the UE may follow different selection methods.

For example, the UE may determine a smallest-numbered PUCCH resource thereof, a largest-numbered PUCCH resource thereof, a PUCCH resource corresponding to a smallest-numbered carrier in K activated carriers corresponding to the K pieces of CSI, or a PUCCH resource corresponding to a largest-numbered carrier in K activated carriers corresponding to the K pieces of CSI. Alternatively, a base station may send information to the UE, to instruct the UE to specifically determine which PUCCH resource is used as the first PUCCH resource, or the UE may determine the first PUCCH resource according to stipulation in a protocol or a standard.

Alternatively, the UE may select a PUCCH resource in a default mode, for example, in a mode of default setting. If a PUCCH resource corresponding to the PUCCH format 3 or the PUCCH format 4 needs to be selected, it is determined that a PUCCH-format-3 PUCCH resource or a PUCCH-format-4 PUCCH resource corresponding to a downlink primary component carrier is used as the PUCCH resource for transmitting the to-be-reported CSI. If a PUCCH resource corresponding to the PUCCH format 2 needs to be determined, the PUCCH-format-2 PUCCH resource of a downlink carrier group corresponding to the CSI that needs to be reported is determined. In this embodiment of the present invention, the PUCCH-format-2 PUCCH resource of a downlink carrier group corresponding to the K (as described above, K=1 is used as an example) pieces of CSI are directly determined for transmitting the K pieces of CSI.

Regardless of how the PUCCH resource is determined, a best manner is that the PUCCH resource is determined according to stipulation in a standard or is determined by means of negotiation between the base station and the UE in advance. In this way, the base station may also know which PUCCH resource is specifically selected by the UE for transmitting periodic CSI, thereby preventing, as far as possible, the base station from performing blind detection on multiple PUCCH resources.

Optionally, in this embodiment of the present invention, if the at least two PUCCH resources include the PUCCH resource corresponding to the PUCCH format 2 and the PUCCH resource corresponding to the PUCCH format 4, the determining, according to a quantity of carriers corresponding to the to-be-reported CSI, that the format of the PUCCH resource corresponding to the to-be-reported CSI is the first format includes:

if the quantity of carriers is greater than a first quantity, determining that the format of the PUCCH resource corresponding to the to-be-reported CSI is the PUCCH format 4; otherwise, determining that the format of the PUCCH resource corresponding to the to-be-reported CSI is the PUCCH format 2.

In this embodiment of the present invention, for example, the first quantity is 1. A capacity of the PUCCH resource corresponding to the PUCCH format 2 is 11 bits, a capacity of the PUCCH resource corresponding to the PUCCH format 4 is 128 bits or even up to 320 bits, and one piece of CSI generally occupies 11 bits. Therefore, if the total quantity of carriers corresponding to the to-be-reported CSI is greater than 1, it indicates that a quantity of the to-be-reported CSI is greater than 1 (generally, one carrier is corresponding to one piece of CSI). Apparently, the PUCCH resource corresponding to the PUCCH format 2 cannot be used for transmitting all of the to-be-reported CSI. Therefore, in this case, the PUCCH resource corresponding to the PUCCH format 4 may be selected for transmitting the to-be-reported CSI, to ensure, as far as possible, that all of the CSI that needs to be reported in one uplink subframe can be transmitted. Alternatively, if the total quantity of carriers corresponding to the to-be-reported CSI is less than or equal to 1, the PUCCH resource corresponding to the PUCCH format 2 can be used for transmitting all of the to-be-reported CSI. In this case, there is no need to select a larger-capacity PUCCH resource corresponding to the PUCCH format 4, thereby saving network resources as far as possible.

Similarly, in this embodiment of the present invention, for example, a PUCCH-format-2 PUCCH resource and a PUCCH-format-4 PUCCH resource are configured for each downlink carrier group. PUCCH-format-2 PUCCH resources configured for different downlink carrier groups may be the same or different. Similarly, PUCCH-format-4 PUCCH resources configured for different downlink carrier groups may be the same or different. For example, it is determined that CSI of K activated carriers needs to be reported in an uplink subframe n, and K pieces of CSI are corresponding to K downlink carrier groups. Then, K PUCCH-format-4 PUCCH resources may be available for selection. That is, the UE needs to determine one PUCCH resource from the K PUCCH-format-4 PUCCH resources to transmit the K pieces of CSI. For a specific determining manner of the UE, refer to the foregoing descriptions (that is, descriptions about how the UE determines one PUCCH resource from K PUCCH-format-2 PUCCH resources corresponding to the K downlink carrier groups). Details are not further described herein.

Optionally, in this embodiment of the present invention, if the at least two PUCCH resources include the PUCCH resource corresponding to the PUCCH format 3 and the PUCCH resource corresponding to the PUCCH format 4, the determining, according to a quantity of carriers corresponding to the to-be-reported CSI, that the format of the PUCCH resource corresponding to the to-be-reported CSI is the first format includes:

if the quantity of carriers is greater than a second quantity, determining that the format of the PUCCH resource corresponding to the to-be-reported CSI is the PUCCH format 4; otherwise, determining that the format of the PUCCH resource corresponding to the to-be-reported CSI is the PUCCH format 3.

In this embodiment of the present invention, for example, the second quantity is 2. A capacity of the PUCCH resource corresponding to the PUCCH format 3 is 22 bits, a capacity of the PUCCH resource corresponding to the PUCCH format 4 is 128 bits or even up to 320 bits, and one piece of CSI generally occupies 11 bits. Therefore, if the total quantity of carriers corresponding to the to-be-reported CSI is greater than 2, it indicates that a quantity of the to-be-reported CSI is greater than 2. Apparently, the PUCCH resource corresponding to the PUCCH format 3 cannot be used for transmitting all of the to-be-reported CSI. Therefore, in this case, the PUCCH resource corresponding to the PUCCH format 4 may be selected for transmitting the to-be-reported CSI, to ensure, as far as possible, that all of the CSI that needs to be reported in one uplink subframe can be transmitted. Alternatively, if the total quantity of carriers corresponding to the to-be-reported CSI is less than or equal to 2, the PUCCH resource corresponding to the PUCCH format 3 can be used for transmitting all of the to-be-reported CSI. In this case, there is no need to select a larger-capacity PUCCH resource corresponding to the PUCCH format 4, thereby saving network resources as far as possible.

Similarly, in this embodiment of the present invention, for example, a PUCCH-format-3 PUCCH resource and a PUCCH-format-4 PUCCH resource are configured for each downlink carrier group. PUCCH-format-3 PUCCH resources configured for different downlink carrier groups may be the same or different. Similarly, PUCCH-format-4 PUCCH resources configured for different downlink carrier groups may be the same or different. For example, it is determined that CSI of K activated carriers needs to be reported in an uplink subframe n, and K pieces of CSI are corresponding to K downlink carrier groups. Then, K PUCCH-format-3 PUCCH resources may be available for selection. That is, the UE needs to determine one PUCCH resource from the K PUCCH-format-3 PUCCH resources to transmit the K pieces of CSI. For a specific determining manner of the UE, refer to the foregoing descriptions (that is, the foregoing descriptions about how the UE determines one PUCCH resource from K PUCCH-format-2 PUCCH resources corresponding to the K downlink carrier groups). Details are not further described herein.

Optionally, in this embodiment of the present invention, if the at least two PUCCH resources include the PUCCH resource corresponding to the PUCCH format 2, the PUCCH resource corresponding to the PUCCH format 3, and the PUCCH resource corresponding to the PUCCH format 4, the determining, according to a quantity of carriers of the to-be-reported CSI, that the format of the PUCCH resource corresponding to the CSI is the first format includes:

if the quantity of carriers is less than or equal to a first quantity, determining that the format of the PUCCH resource corresponding to the to-be-reported CSI is the PUCCH format 2; or if the quantity of carriers is greater than the first quantity and is less than or equal to a second quantity, determining that the format of the PUCCH resource corresponding to the to-be-reported CSI is the PUCCH format 3; or if the quantity of carriers is greater than the second quantity, determining that the format of the PUCCH resource corresponding to the to-be-reported CSI is the PUCCH format 4.

In this embodiment of the present invention, for example, the first quantity is 1, and the second quantity is 2. A capacity of the PUCCH resource corresponding to the PUCCH format 2 is 11 bits, a capacity of the PUCCH resource corresponding to the PUCCH format 3 is 22 bits, a capacity of the PUCCH resource corresponding to the PUCCH format 4 is 128 bits or even up to 320 bits, and one piece of CSI generally occupies 11 bits. Therefore, if the total quantity of carriers corresponding to the to-be-reported CSI is less than or equal to 1 (Certainly, the quantity of carriers is not a decimal. If the quantity is less than or equal to 1, an only case is that the quantity is 1. If the quantity is 0, it indicates that no CSI is to be reported, and a subsequent procedure is not performed. Therefore, the case when the quantity is 0 is not described in this embodiment of the present invention), it indicates that a quantity of to-be-reported CSI is less than or equal to 1. In this case, the PUCCH resource corresponding to the PUCCH format 2 can be used for transmitting the to-be-reported CSI, without wasting another larger-capacity PUCCH resource. This saves network resources. If the total quantity of carriers corresponding to the to-be-reported CSI is greater than 1 and less than and equal to 2 (similarly, because the quantity is not a decimal, it indicates that the quantity is 2 in this case), it indicates that a quantity of to-be-reported CSI is greater than 1 and less than and equal to 2. In this case, the PUCCH resource corresponding to the PUCCH format 3 can be used for transmitting the to-be-reported CSI, without wasting another larger-capacity PUCCH resource. This saves network resources. If the total quantity of carriers corresponding to the to-be-reported CSI is greater than 2, it indicates that a quantity of the to-be-reported CSI is greater than 2. Apparently, neither the PUCCH resource corresponding to the PUCCH format 2 nor the PUCCH resource corresponding to the PUCCH format 3 can be used for transmitting all of the to-be-reported CSI. Therefore, in this case, the PUCCH resource corresponding to the PUCCH format 4 may be selected for transmitting the to-be-reported CSI, to ensure, as far as possible, that all of the CSI that needs to be reported in one uplink subframe can be transmitted.

It can be learned that, in this embodiment of the present invention, CSI that needs to be reported in one uplink subframe can be transmitted by using one PUCCH resource. This saves PUCCH resources, avoids that CSI that needs to be transmitted is discarded during transmission, and ensures, as far as possible, that CSI of all downlink carriers can be transmitted to a base station, so that the base station can relatively effectively schedule a downlink carrier. In addition, PUCCH resources in at least two PUCCH formats are configured for each downlink carrier group, and an appropriate PUCCH resource is determined according to a specific condition of determining, for transmitting to-be-reported CSI. This ensures that CSI that needs to be transmitted can be transmitted normally, and saves PUCCH resources as far as possible. For example, when a smaller-capacity PUCCH resource can be used, a larger-capacity PUCCH resource is not selected for use. Therefore, a network operation rate is increased.

Similarly, in this embodiment of the present invention, for example, a PUCCH-format-2 PUCCH resource, a PUCCH-format-3 PUCCH resource, and a PUCCH-format-4 PUCCH resource are configured for each downlink carrier group. PUCCH-format-2 PUCCH resources configured for different downlink carrier groups may be the same or different, and PUCCH-format-3 PUCCH resources configured for different downlink carrier groups may be the same or different. Similarly, PUCCH-format-4 PUCCH resources configured for different downlink carrier groups may be the same or different. For example, it is determined that CSI of K activated carriers needs to be reported in an uplink subframe n, and K pieces of CSI are corresponding to K downlink carrier groups. Then, K PUCCH-format-3 PUCCH resources may be available for selection. That is, the UE needs to determine one PUCCH resource from the K PUCCH-format-3 PUCCH resources to transmit the K pieces of CSI. For a specific determining manner of the UE, refer to the foregoing descriptions (that is, the foregoing descriptions about how the UE determines one PUCCH resource from K PUCCH-format-2 PUCCH resources corresponding to the K downlink carrier groups). Details are not further described herein.

2. The specific parameter corresponding to the CSI refers to a quantity of bits corresponding to the CSI.

Optionally, in this embodiment of the present invention, the determining, according to the to-be-reported CSI, that a format of a PUCCH resource corresponding to the to-be-reported CSI is a first format includes:

determining, according to a quantity of bits of the to-be-reported CSI, that the format of the PUCCH resource corresponding to the to-be-reported CSI is the first format.

Specifically, if the specific parameter corresponding to the CSI refers to the quantity of bits of the CSI, a correspondence between a value of the specific parameter corresponding to the CSI and the format of the PUCCH resource may be a correspondence between a range of the quantity of bits of the CSI and the format of the PUCCH resource.

That is, the specific parameter corresponding to the to-be-reported CSI is the total quantity of bits corresponding to the to-be-reported CSI. For example, a total of three pieces of CSI are obtained, and the specific parameter corresponding to the to-be-reported CSI is a total quantity of bits corresponding to the three pieces of CSI.

Optionally, in this embodiment of the present invention, if the at least two PUCCH resources include the PUCCH resource corresponding to the PUCCH format 2 and the PUCCH resource corresponding to the PUCCH format 3, the determining, according to a quantity of bits of the to-be-reported CSI, that the format of the PUCCH resource corresponding to the to-be-reported CSI is the first format includes:

if the quantity of bits is greater than a third quantity, determining that the format of the PUCCH resource corresponding to the to-be-reported CSI is the PUCCH format 3; otherwise, determining that the format of the PUCCH resource corresponding to the to-be-reported CSI is the PUCCH format 2.

In this embodiment of the present invention, for example, the third quantity is 11. A capacity of the PUCCH resource corresponding to the PUCCH format 2 is 11 bits, a capacity of the PUCCH resource corresponding to the PUCCH format 3 is 22 bits, and one piece of CSI generally occupies 11 bits. Therefore, if the total quantity of bits corresponding to the to-be-reported CSI is greater than 11, the PUCCH resource corresponding to the PUCCH format 2 apparently cannot be used for transmitting all of the to-be-reported CSI. Therefore, in this case, the PUCCH resource corresponding to the PUCCH format 3 may be selected for transmitting the to-be-reported CSI, to ensure, as far as possible, that all of the CSI that needs to be reported in one uplink subframe can be transmitted. Alternatively, if the total quantity of bits corresponding to the to-be-reported CSI is less than or equal to 11, the PUCCH resource corresponding to the PUCCH format 2 can be used for transmitting all of the to-be-reported CSI. In this case, there is no need to select a larger-capacity PUCCH resource corresponding to the PUCCH format 3, thereby saving network resources as far as possible.

Similarly, it is determined that there are M bits of CSI that needs to be reported in total in an uplink subframe n. For example, M=22. M pieces of CSI are corresponding to M downlink carrier groups. Then, M PUCCH-format-3 PUCCH resources may be available for selection. That is, the UE needs to determine one PUCCH resource from the M PUCCH-format-3 PUCCH resources to transmit the M pieces of CSI. For a specific selection manner of the UE, refer to the foregoing descriptions. Details are not further described herein.

Optionally, in this embodiment of the present invention, if the at least two PUCCH resources include the PUCCH resource corresponding to the PUCCH format 2 and the PUCCH resource corresponding to the PUCCH format 4, the determining, according to a quantity of bits of the to-be-reported CSI, that the format of the PUCCH resource corresponding to the to-be-reported CSI is the first format includes:

if the quantity of bits is greater than a third quantity, determining that the format of the PUCCH resource corresponding to the to-be-reported CSI is the PUCCH format 4; otherwise, determining that the format of the PUCCH resource corresponding to the to-be-reported CSI is the PUCCH format 2.

In this embodiment of the present invention, for example, the third quantity is 11. A capacity of the PUCCH resource corresponding to the PUCCH format 2 is 11 bits, a capacity of the PUCCH resource corresponding to the PUCCH format 4 is 128 bits or even up to 320 bits, and one piece of CSI generally occupies 11 bits. Therefore, if the total quantity of bits corresponding to the to-be-reported CSI is greater than 11, the PUCCH resource corresponding to the PUCCH format 2 apparently cannot be used for transmitting all of the to-be-reported CSI. Therefore, in this case, the PUCCH resource corresponding to the PUCCH format 4 may be selected for transmitting the to-be-reported CSI, to ensure, as far as possible, that all of the CSI that needs to be reported in one uplink subframe can be transmitted. Alternatively, if the total quantity of bits corresponding to the to-be-reported CSI is less than or equal to 11, the PUCCH resource corresponding to the PUCCH format 2 can be used for transmitting all of the to-be-reported CSI. In this case, there is no need to select a larger-capacity PUCCH resource corresponding to the PUCCH format 4, thereby saving network resources as far as possible.

Similarly, it is determined that there are M bits of CSI that needs to be reported in total in a same uplink subframe n. M pieces of CSI are corresponding to M downlink carrier groups. Then, M PUCCH-format-4 PUCCH resources may be available for selection. That is, the UE needs to select one PUCCH resource from the M PUCCH-format-4 PUCCH resources to transmit the M pieces of CSI. For a specific selection manner of the UE, refer to the foregoing descriptions. Details are not further described herein.

Optionally, in this embodiment of the present invention, if the at least two PUCCH resources include the PUCCH resource corresponding to the PUCCH format 3 and the PUCCH resource corresponding to the PUCCH format 4, the determining, according to a quantity of bits of the to-be-reported CSI, that the format of the PUCCH resource corresponding to the to-be-reported CSI is the first format includes:

if the quantity of bits is greater than a fourth quantity, determining that the format of the PUCCH resource corresponding to the to-be-reported CSI is the PUCCH format 4; otherwise, determining that the format of the PUCCH resource corresponding to the to-be-reported CSI is the PUCCH format 3.

In this embodiment of the present invention, for example, the fourth quantity is 22. A capacity of the PUCCH resource corresponding to the PUCCH format 3 is 22 bits, a capacity of the PUCCH resource corresponding to the PUCCH format 4 is 128 bits or even up to 320 bits, and one piece of CSI generally occupies 11 bits. Therefore, if the total quantity of carriers corresponding to the to-be-reported CSI is greater than 22, the PUCCH resource corresponding to the PUCCH format 3 apparently cannot be used for transmitting all of the to-be-reported CSI. Therefore, in this case, the PUCCH resource corresponding to the PUCCH format 4 may be selected for transmitting the to-be-reported CSI, to ensure, as far as possible, that all of the CSI that needs to be reported in one uplink subframe can be transmitted. Alternatively, if the total quantity of bits corresponding to the to-be-reported CSI is less than or equal to 22, the PUCCH resource corresponding to the PUCCH format 3 can be used for transmitting all of the to-be-reported CSI. In this case, there is no need to select a larger-capacity PUCCH resource corresponding to the PUCCH format 4, thereby saving network resources as far as possible.

Similarly, it is determined that there are M bits of CSI that needs to be reported in total in an uplink subframe n. M pieces of CSI are corresponding to M downlink carrier groups. Then, M PUCCH-format-4 PUCCH resources may be available for selection. That is, the UE needs to determine one PUCCH resource from the M PUCCH-format-4 PUCCH resources to transmit the M pieces of CSI. For a specific selection manner of the UE, refer to the foregoing descriptions. Details are not further described herein.

Optionally, in this embodiment of the present invention, if the at least two PUCCH resources include the PUCCH resource corresponding to the PUCCH format 2, the PUCCH resource corresponding to the PUCCH format 3, and the PUCCH resource corresponding to the PUCCH format 4, the determining, according to a quantity of bits of the to-be-reported CSI, that the format of the PUCCH resource corresponding to the CSI is the first format includes:

if the quantity of bits is less than or equal to a third quantity, determining that the format of the PUCCH resource corresponding to the to-be-reported CSI is the PUCCH format 2; or if the quantity of bits is greater than the third quantity and is less than or equal to a fourth quantity, determining that the format of the PUCCH resource corresponding to the to-be-reported CSI is the PUCCH format 3; or if the quantity of bits is greater than the fourth quantity, determining that the format of the PUCCH resource corresponding to the to-be-reported CSI is the PUCCH format 4.

In this embodiment of the present invention, for example, the third quantity is 11, and the fourth quantity is 22. A capacity of the PUCCH resource corresponding to the PUCCH format 2 is 11 bits, a capacity of the PUCCH resource corresponding to the PUCCH format 3 is 22 bits, a capacity of the PUCCH resource corresponding to the PUCCH format 4 is 128 bits or even up to 320 bits, and one piece of CSI generally occupies 11 bits. Therefore, if the total quantity of bits corresponding to the to-be-reported CSI is less than or equal to 11, the PUCCH resource corresponding to the PUCCH format 2 can be used for transmitting the to-be-reported CSI, without wasting another larger-capacity PUCCH resource. This saves network resources. If the total quantity of bits corresponding to to-be-reported CSI is greater than 11 and is less than or equal to 22, the PUCCH resource corresponding to the PUCCH format 3 can be used for transmitting to-be-reported CSI, without wasting another larger-capacity PUCCH resource. This saves network resources. If the total quantity of bits corresponding to the to-be-reported CSI is greater than 22, neither the PUCCH resource corresponding to the PUCCH format 2 nor the PUCCH resource corresponding to the PUCCH format 3 apparently can be used for transmitting all of the to-be-reported CSI. Therefore, in this case, the PUCCH resource corresponding to the PUCCH format 4 may be selected for transmitting the to-be-reported CSI, to ensure, as far as possible, that all of the CSI that needs to be reported in one uplink subframe can be transmitted.

It can be learned that, in this embodiment of the present invention, CSI that needs to be reported in one uplink subframe can be transmitted by using one PUCCH resource. This saves PUCCH resources, avoids that CSI that needs to be transmitted is discarded during transmission, and ensures, as far as possible, that CSI of all downlink carriers can be transmitted to a base station, so that the base station can relatively effectively schedule a downlink carrier. In addition, PUCCH resources in at least two PUCCH formats are configured for each downlink carrier group, and an appropriate PUCCH resource is selected according to a specific condition of determining, for transmitting to-be-reported CSI. This ensures that CSI that needs to be transmitted can be transmitted normally, and saves PUCCH resources as far as possible. For example, when a smaller-capacity PUCCH resource can be used, a larger-capacity PUCCH resource is not selected for use. Therefore, a network operation rate is increased.

Similarly, it is determined that there are M bits of CSI that needs to be reported in total in an uplink subframe n. M pieces of CSI are corresponding to M downlink carrier groups. Then, M PUCCH-format-4 PUCCH resources may be available for selection. That is, the UE needs to determine one PUCCH resource from the M PUCCH-format-4 PUCCH resources to transmit the M pieces of CSI. For a specific selection manner of the UE, refer to the foregoing descriptions. Details are not further described herein.

Step 103. Add the to-be-reported CSI to a first first-format PUCCH resource, and report the to-be-reported CSI.

In this embodiment of the present invention, for example, a PUCCH resource selected by the UE is referred to as the first PUCCH resource. That is, the UE needs to use the first PUCCH resource to report the CSI. UE may add all obtained CSI to the first PUCCH resource, and report the CSI.

Optionally, in this embodiment of the present invention, the adding the to-be-reported CSI to a first first-format PUCCH resource, and reporting the to-be-reported CSI includes:

determining the first PUCCH resource from at least one first-format PUCCH resource corresponding to each of the one or more downlink carrier groups to which the to-be-reported CSI belongs; and adding the to-be-reported CSI to the first PUCCH resource, and reporting the to-be-reported CSI.

Optionally, in this embodiment of the present invention, the determining the first PUCCH resource from at least one first-format PUCCH resource corresponding to each of the one or more downlink carrier groups to which the to-be-reported CSI belongs includes:

determining the first PUCCH resource from the at least one PUCCH resource according to received information sent by the network device; or determining, from the at least one PUCCH resource, a smallest-numbered PUCCH resource as the first PUCCH resource; or determining, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

A specific selection manner has been described in the foregoing. Details are not further described herein.

Figure 2:
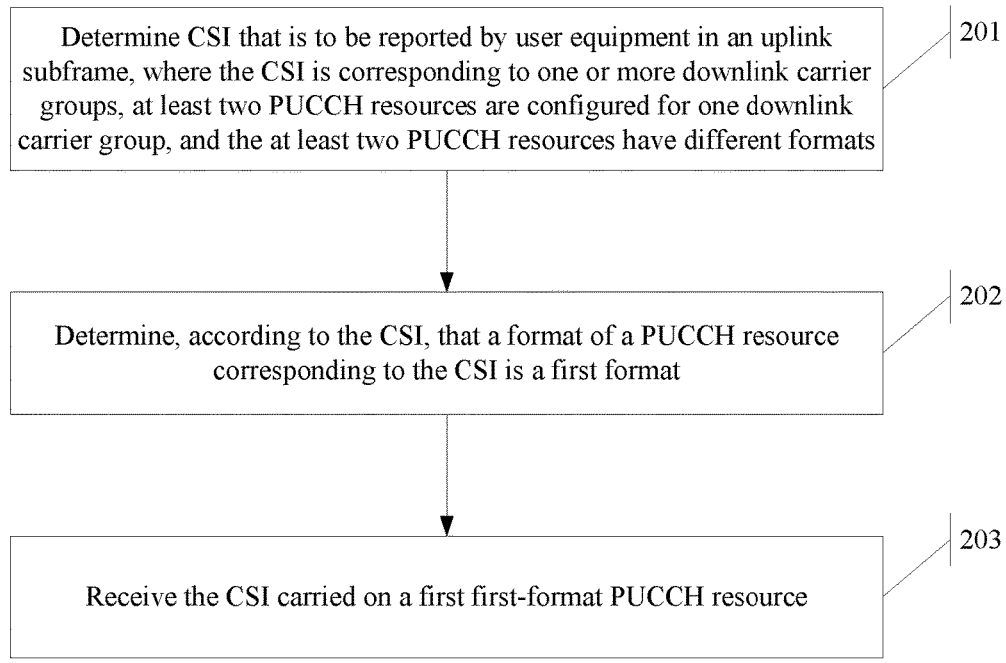
FIG. 2 is a main flowchart of a CSI receiving method according to an embodiment of the present invention.

Referring to FIG. 2, based on a same inventive concept, an embodiment of the present invention provides a CSI receiving method. The method may be applied to a network device. For example, the network device may be a base station. Main procedures of the method are described as follows.

Step 201. Determine CSI that is to be reported by user equipment in an uplink subframe, where the CSI is corresponding to one or more downlink carrier groups, at least two PUCCH resources are configured for one downlink carrier group, and the at least two PUCCH resources have different formats.

In this embodiment of the present invention, referring to procedures of FIG. 1, it can be learned that UE adds, to one PUCCH resource, CSI that is to be reported, and reports the CSI. This greatly reduces PUCCH resource overheads. Specific implementation processes of obtaining CSI and determining a PUCCH resource by the UE, and the like have been described in the procedures of FIG. 1.

The base station knows which CSI is reported by the UE in advance.

Optionally, in this embodiment of the present invention, before the determining CSI that is to be reported by user equipment in an uplink subframe, the method may further include:

configuring the at least two PUCCH resources for each downlink carrier group of the UE.

That is, PUCCH resources of a downlink carrier group of the UE are pre-configured by the base station.

Optionally, in this embodiment of the present invention, the method may further include:

sending an activation instruction or a deactivation instruction to the UE.

The activation instruction is used to instruct the UE to activate a corresponding carrier in a downlink carrier group of the UE. The deactivation instruction is used to instruct the UE to disable a corresponding carrier in a downlink carrier group of the UE.

In this embodiment of the present invention, the base station sends an activation instruction or a deactivation instruction to the UE, and the base station configures PUCCH resources for a downlink carrier group of the UE. An implementation sequence between sending an activation instruction or a deactivation instruction by the base station to the UE and configuring PUCCH resources for a downlink carrier group of the UE by the base station may be at random.

Optionally, in this embodiment of the present invention, the at least two PUCCH resources include a PUCCH resource corresponding to a PUCCH format 2 and a PUCCH resource corresponding to a PUCCH format 3; or the at least two PUCCH resources include a PUCCH resource corresponding to a PUCCH format 2 and a PUCCH resource corresponding to a PUCCH format 4; or the at least two PUCCH resources include a PUCCH resource corresponding to a PUCCH format 3 and a PUCCH resource corresponding to a PUCCH format 4; or the at least two PUCCH resources include a PUCCH resource corresponding to a PUCCH format 2, a PUCCH resource corresponding to a PUCCH format 3, and a PUCCH resource corresponding to a PUCCH format 4.

Step 202. Determine, according to the CSI, that a format of a PUCCH resource corresponding to the CSI is a first format.

Specifically, the format of the PUCCH resource corresponding to the to-be-reported CSI may be determined according to a value of a specific parameter corresponding to the to-be-reported CSI. For example, the determined format is referred to as the first format.

Specifically, a correspondence between a value of a specific parameter corresponding to CSI and a format of a PUCCH resource may be pre-stored in the base station. The specific parameter corresponding to the CSI may be a quantity of carriers corresponding to the CSI, a quantity of bits corresponding to the CSI, or the like. This is not limited in the present invention. A person skilled in the art naturally knows that the correspondence may have corresponding variations when the specific parameter corresponding to the CSI varies.

Optionally, when the specific parameter corresponding to the CSI varies, the base station determines the format of the PUCCH resource corresponding to the to-be-reported CSI in a different manner.

1. The specific parameter corresponding to the CSI refers to a quantity of carriers corresponding to the CSI.

Optionally, in this embodiment of the present invention, the determining, according to the CSI, that a format of a PUCCH resource corresponding to the CSI is a first format includes:

determining, according to a quantity of carriers corresponding to the CSI, that the format of the PUCCH resource corresponding to the CSI is the first format.

Optionally, in this embodiment of the present invention, if the at least two PUCCH resources include the PUCCH resource corresponding to the PUCCH format 2 and the PUCCH resource corresponding to the PUCCH format 3, the determining, according to a quantity of carriers corresponding to the CSI, that the format of the PUCCH resource corresponding to the CSI is the first format includes:

if the quantity of carriers is greater than a first quantity, determining that the format of the PUCCH resource corresponding to the CSI is the PUCCH format 3; otherwise, determining that the format of the PUCCH resource corresponding to the CSI is the PUCCH format 2;

Optionally, in this embodiment of the present invention, if the at least two PUCCH resources include the PUCCH resource corresponding to the PUCCH format 2 and the PUCCH resource corresponding to the PUCCH format 4, the determining, according to a quantity of carriers corresponding to the CSI, that the format of the PUCCH resource corresponding to the CSI is the first format includes:

if the quantity of carriers is greater than a first quantity, determining that the format of the PUCCH resource corresponding to the CSI is the PUCCH format 4; otherwise, determining that the format of the PUCCH resource corresponding to the CSI is the PUCCH format 2.

Optionally, in this embodiment of the present invention, if the at least two PUCCH resources include the PUCCH resource corresponding to the PUCCH format 3 and the PUCCH resource corresponding to the PUCCH format 4, the determining, according to a quantity of carriers corresponding to the CSI, that the format of the PUCCH resource corresponding to the CSI is the first format includes:

if the quantity of carriers is greater than a second quantity, determining that the format of the PUCCH resource corresponding to the CSI is the PUCCH format 4; otherwise, determining that the format of the PUCCH resource corresponding to the CSI is the PUCCH format 3;

Optionally, in this embodiment of the present invention, if the at least two PUCCH resources include the PUCCH resource corresponding to the PUCCH format 2, the PUCCH resource corresponding to the PUCCH format 3, and the PUCCH resource corresponding to the PUCCH format 4, the determining, according to a quantity of carriers corresponding to the CSI, that the format of the PUCCH resource corresponding to the CSI is the first format includes:

if the quantity of carriers is less than or equal to a first quantity, determining that the format of the PUCCH resource corresponding to the CSI is the PUCCH format 2; or if the quantity of carriers is greater than the first quantity and is less than or equal to a second quantity, determining that the format of the PUCCH resource corresponding to the CSI is the PUCCH format 3; or if the quantity of carriers is greater than the second quantity, determining that the format of the PUCCH resource corresponding to the CSI is the PUCCH format 4.

2. The specific parameter corresponding to the CSI refers to a quantity of bits corresponding to the CSI.

Optionally, in this embodiment of the present invention, the determining, according to the CSI, that a format of a PUCCH resource corresponding to the CSI is a first format includes:

determining, according to a quantity of bits of the CSI, that the format of the PUCCH resource corresponding to the CSI is the first format.

Optionally, in this embodiment of the present invention, if the at least two PUCCH resources include the PUCCH resource corresponding to the PUCCH format 2 and the PUCCH resource corresponding to the PUCCH format 3, the determining, according to a quantity of bits of the CSI, that the format of the PUCCH resource corresponding to the CSI is the first format includes:

if the quantity of bits is greater than a third quantity, determining that the format of the PUCCH resource corresponding to the CSI is the PUCCH format 3; otherwise, determining that the format of the PUCCH resource corresponding to the CSI is the PUCCH format 2.

Optionally, in this embodiment of the present invention, if the at least two PUCCH resources include the PUCCH resource corresponding to the PUCCH format 2 and the PUCCH resource corresponding to the PUCCH format 4, the determining, according to a quantity of bits of the CSI, that the format of the PUCCH resource corresponding to the CSI is the first format includes:

if the quantity of bits is greater than a third quantity, determining that the format of the PUCCH resource corresponding to the CSI is the PUCCH format 4; otherwise, determining that the format of the PUCCH resource corresponding to the CSI is the PUCCH format 2.

Optionally, in this embodiment of the present invention, if the at least two PUCCH resources include the PUCCH resource corresponding to the PUCCH format 3 and the PUCCH resource corresponding to the PUCCH format 4, the determining, according to a quantity of bits of the CSI, that the format of the PUCCH resource corresponding to the CSI is the first format includes:

if the quantity of bits is greater than a fourth quantity, determining that the format of the PUCCH resource corresponding to the CSI is the PUCCH format 4; otherwise, determining that the format of the PUCCH resource corresponding to the CSI is the PUCCH format 3.

Optionally, in this embodiment of the present invention, if the at least two PUCCH resources include the PUCCH resource corresponding to the PUCCH format 2, the PUCCH resource corresponding to the PUCCH format 3, and the PUCCH resource corresponding to the PUCCH format 4, the determining, according to a quantity of bits of the CSI, that the format of the PUCCH resource corresponding to the CSI is the first format includes:

if the quantity of bits is less than or equal to a third quantity, determining that the format of the PUCCH resource corresponding to the CSI is the PUCCH format 2; or if the quantity of bits is greater than the third quantity and is less than or equal to a fourth quantity, determining that the format of the PUCCH resource corresponding to the CSI is the PUCCH format 3; or if the quantity of bits is greater than the fourth quantity, determining that the format of the PUCCH resource corresponding to the CSI is the PUCCH format 4.

Specific implementations and examples related to the several different cases in the foregoing have been described in the procedures of FIG. 1. That is, the base station and UE select a PUCCH resource for to-be-reported CSI basically in a same processing manner.

Step 203. Receive the CSI carried on a first first-format PUCCH resource.

In this embodiment of the present invention, the PUCCH resource that is finally selected by the UE is referred to as the first PUCCH resource. Certainly, the base station and the UE have a same selection manner. Therefore, a resource that is finally selected by the base station is also the first PUCCH resource. After selecting the first PUCCH resource, the UE reports the to-be-reported CSI on the first PUCCH resource. Because the base station knows that the UE reports the CSI by using the first PUCCH resource, the base station directly receives the CSI by using the first PUCCH resource. This prevents the base station from performing blind detection on different PUCCH resources.

Optionally, in this embodiment, before the receiving the CSI carried on a first first-format PUCCH resource, the method further includes:

determining the first PUCCH resource from at least one first-format PUCCH resource corresponding to each of the one or more downlink carrier groups to which the CSI belongs; and determining to receive the CSI by using the first PUCCH resource.

Optionally, in this embodiment of the present invention, the determining the first PUCCH resource from at least one first-format PUCCH resource corresponding to each of the one or more downlink carrier groups to which the CSI belongs includes:

determining the first PUCCH resource from the at least one PUCCH resource according to received information sent by the network device; or determining, from the at least one PUCCH resource, a smallest-numbered PUCCH resource as the first PUCCH resource; or determining, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

For a specific manner, refer to descriptions in the procedures of FIG. 1. In addition, for all those not specifically described in the procedures of FIG. 2, refer to the procedures of FIG. 1.

In this embodiment of the present invention, at least two PUCCH resources are configured for each downlink carrier group. CSI that needs to be reported in one uplink subframe may be obtained, and a format of a corresponding PUCCH resource is determined according to the to-be-reported CSI. For example, the determined format is referred to as a first format. Then, all of the to-be-reported CSI is reported after being added to a first first-format PUCCH resource. Therefore, in this embodiment of the present invention, the CSI that needs to be reported in one uplink subframe may be reported by occupying only one PUCCH resource. This greatly reduces PUCCH resource overheads and improves a throughput of an uplink system compared with a prior-art solution that each CSI needs to occupy one PUCCH resource.

Moreover, in the prior art, if CSI of different carriers needs to be reported in one uplink subframe, only one piece of CSI can be selected for reporting, and other non-selected CSI is discarded. That is, CSI corresponding to some carriers cannot be reported, and a base station cannot perform effective downlink data scheduling for a downlink carrier corresponding to the unreported CSI. This causes performance deterioration of a downlink system. However, after the technical solution in this embodiment of the present invention is used, CSI that needs to be reported in one uplink subframe can be reported after being added to a same PUCCH resource. This avoids, as far as possible, discarding CSI, and ensures that CSI of all downlink carriers that needs to be reported can be reported, so that a base station can relatively effectively schedule the downlink carriers, thereby improving performance of the downlink system.

Moreover, in this embodiment of the present invention, the base station selects a PUCCH resource in a same manner as UE, and the base station and the UE select a same PUCCH resource. Therefore, the base station knows which PUCCH resource is used by the UE to transmit CSI, and can directly receive the CSI on the PUCCH resource. This prevents the base station from performing blind detection, and reduces load of the base station.

In the following, apparatuses in embodiments of the present invention are described with reference to the accompanying drawings.

Figure 3:
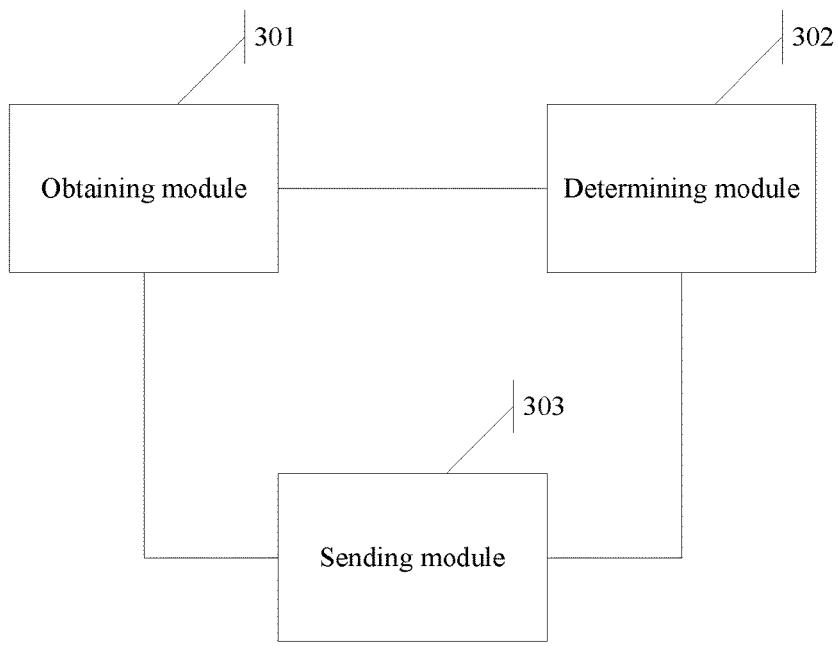
FIG. 3 is a structural block diagram of user equipment according to an embodiment of the present invention.

Referring to FIG. 3, based on a same inventive concept, an embodiment of the present invention provides user equipment. The user equipment may include an obtaining module 301, a determining module 302, and a sending module 303.

The obtaining module 301 is configured to obtain channel state information CSI that is to be reported in an uplink subframe. The to-be-reported CSI is corresponding to one or more downlink carrier groups. At least two physical uplink control channel PUCCH resources are configured for one downlink carrier group. The at least two PUCCH resources have different formats.

The determining module 302 is configured to determine, according to the to-be-reported CSI, that a format of a PUCCH resource corresponding to the to-be-reported CSI is a first format.

The sending module 303 is configured to add the to-be-reported CSI to a first first-format PUCCH resource, and report the to-be-reported CSI.

Optionally, in this embodiment of the present invention, the at least two PUCCH resources include a PUCCH resource corresponding to a PUCCH format 2 and a PUCCH resource corresponding to a PUCCH format 3; or the at least two PUCCH resources include a PUCCH resource corresponding to a PUCCH format 2 and a PUCCH resource corresponding to a PUCCH format 4; or the at least two PUCCH resources include a PUCCH resource corresponding to a PUCCH format 3 and a PUCCH resource corresponding to a PUCCH format 4; or the at least two PUCCH resources include a PUCCH resource corresponding to a PUCCH format 2, a PUCCH resource corresponding to a PUCCH format 3, and a PUCCH resource corresponding to a PUCCH format 4.

Optionally, in this embodiment of the present invention, the determining module 302 is specifically configured to:

determine, according to a quantity of carriers corresponding to the to-be-reported CSI, that the format of the PUCCH resource corresponding to the to-be-reported CSI is the first format; or determine, according to a quantity of bits of the to-be-reported CSI, that the format of the PUCCH resource corresponding to the to-be-reported CSI is the first format.

Optionally, in this embodiment of the present invention, the at least two PUCCH resources include the PUCCH resource corresponding to the PUCCH format 2 and the PUCCH resource corresponding to the PUCCH format 3; and that the determining module 302 is specifically configured to determine, according to a quantity of carriers corresponding to the to-be-reported CSI, that the format of the PUCCH resource corresponding to the to-be-reported CSI is the first format is specifically: if the quantity of carriers is greater than a first quantity, determining that the format of the PUCCH resource corresponding to the to-be-reported CSI is the PUCCH format 3; otherwise, determining that the format of the PUCCH resource corresponding to the to-be-reported CSI is the PUCCH format 2; or that the determining module 302 is specifically configured to determine, according to a quantity of bits of the to-be-reported CSI, that the format of the PUCCH resource corresponding to the to-be-reported CSI is the first format is specifically:

if the quantity of bits is greater than a third quantity, determining that the format of the PUCCH resource corresponding to the to-be-reported CSI is the PUCCH format 3; otherwise, determining that the format of the PUCCH resource corresponding to the to-be-reported CSI is the PUCCH format 2.

Optionally, in this embodiment of the present invention, the at least two PUCCH resources include the PUCCH resource corresponding to the PUCCH format 2 and the PUCCH resource corresponding to the PUCCH format 4; and that the determining module 302 is specifically configured to determine, according to a quantity of carriers corresponding to the to-be-reported CSI, that the format of the PUCCH resource corresponding to the to-be-reported CSI is the first format is specifically:

if the quantity of carriers is greater than a first quantity, determining that the format of the PUCCH resource corresponding to the to-be-reported CSI is the PUCCH format 4; otherwise, determining that the format of the PUCCH resource corresponding to the to-be-reported CSI is the PUCCH format 2; or that the determining module 302 is specifically configured to determine, according to a quantity of bits of the to-be-reported CSI, that the format of the PUCCH resource corresponding to the to-be-reported CSI is the first format is specifically:

if the quantity of bits is greater than a third quantity, determining that the format of the PUCCH resource corresponding to the to-be-reported CSI is the PUCCH format 4; otherwise, determining that the format of the PUCCH resource corresponding to the to-be-reported CSI is the PUCCH format 2.

Optionally, in this embodiment of the present invention, the at least two PUCCH resources include the PUCCH resource corresponding to the PUCCH format 3 and the PUCCH resource corresponding to the PUCCH format 4; and that the determining module 302 is specifically configured to determine, according to a quantity of carriers corresponding to the to-be-reported CSI, that the format of the PUCCH resource corresponding to the to-be-reported CSI is the first format is specifically:

if the quantity of carriers is greater than a second quantity, determining that the format of the PUCCH resource corresponding to the to-be-reported CSI is the PUCCH format 4; otherwise, determining that the format of the PUCCH resource corresponding to the to-be-reported CSI is the PUCCH format 3; or that the determining module 302 is specifically configured to determine, according to a quantity of bits of the to-be-reported CSI, that the format of the PUCCH resource corresponding to the to-be-reported CSI is the first format is specifically:

if the quantity of bits is greater than a fourth quantity, determining that the format of the PUCCH resource corresponding to the to-be-reported CSI is the PUCCH format 4; otherwise, determining that the format of the PUCCH resource corresponding to the to-be-reported CSI is the PUCCH format 3.

Optionally, in this embodiment of the present invention, the at least two PUCCH resources include the PUCCH resource corresponding to the PUCCH format 2, the PUCCH resource corresponding to the PUCCH format 3, and the PUCCH resource corresponding to the PUCCH format 4; and that the determining module 302 is specifically configured to determine, according to a quantity of carriers corresponding to the to-be-reported CSI, that the format of the PUCCH resource corresponding to the to-be-reported CSI is the first format is specifically:

if the quantity of carriers is less than or equal to a first quantity, determining that the format of the PUCCH resource corresponding to the to-be-reported CSI is the PUCCH format 2; or if the quantity of carriers is greater than the first quantity and is less than or equal to a second quantity, determining that the format of the PUCCH resource corresponding to the to-be-reported CSI is the PUCCH format 3; or if the quantity of carriers is greater than the second quantity, determining that the format of the PUCCH resource corresponding to the to-be-reported CSI is the PUCCH format 4; or that the determining module 302 is specifically configured to determine, according to a quantity of bits of the to-be-reported CSI, that the format of the PUCCH resource corresponding to the to-be-reported CSI is the first format is specifically:

if the quantity of bits is less than or equal to a third quantity, determining that the format of the PUCCH resource corresponding to the to-be-reported CSI is the PUCCH format 2; or if the quantity of bits is greater than the third quantity and is less than or equal to a fourth quantity, determining that the format of the PUCCH resource corresponding to the to-be-reported CSI is the PUCCH format 3; or if the quantity of bits is greater than the fourth quantity, determining that the format of the PUCCH resource corresponding to the to-be-reported CSI is the PUCCH format 4.

Optionally, in this embodiment of the present invention, the sending module 303 is specifically configured to:

determine the first PUCCH resource from at least one first-format PUCCH resource corresponding to each of the one or more downlink carrier groups to which the to-be-reported CSI belongs; and add the to-be-reported CSI to the first PUCCH resource, and report the to-be-reported CSI.

Optionally, in this embodiment of the present invention, that the sending module 303 is specifically configured to determine the first PUCCH resource from at least one first-format PUCCH resource corresponding to each of the one or more downlink carrier groups to which the to-be-reported CSI belongs is specifically:

determining the first PUCCH resource from the at least one PUCCH resource according to received information sent by a network device; or determining, from the at least one PUCCH resource, a smallest-numbered PUCCH resource as the first PUCCH resource; or determining, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

Figure 4:
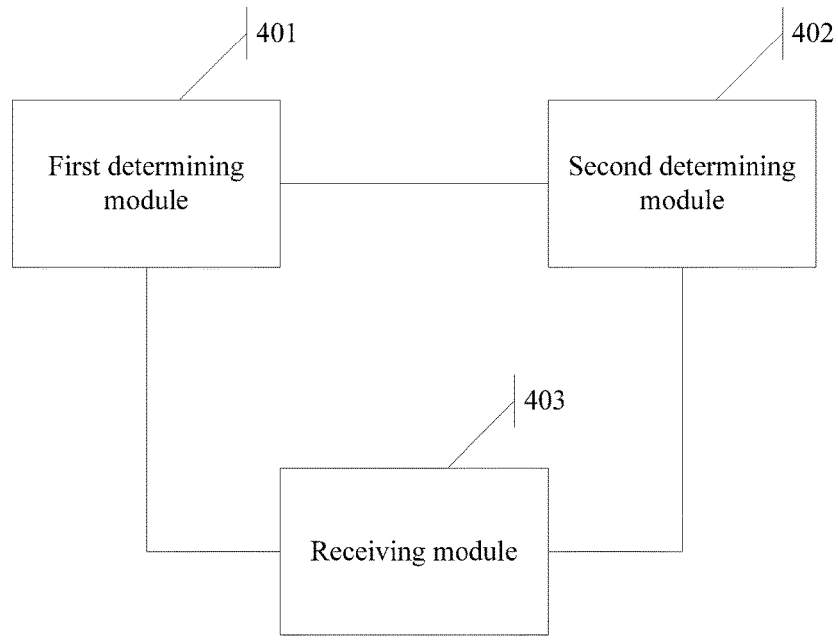
FIG. 4 is a structural block diagram of a network device according to an embodiment of the present invention.

Referring to FIG. 4, based on a same inventive concept, an embodiment of the present invention provides a network device. The network device may be, for example, a base station. The network device may include a first determining module 401, a second determining module 402, and a receiving module 403.

The first determining module 401 is configured to determine CSI that is to be reported by user equipment in an uplink subframe. The CSI is corresponding to one or more downlink carrier groups. At least two PUCCH resources are configured for one downlink carrier group. The at least two PUCCH resources have different formats.

The second determining module 402 is configured to determine, according to the CSI, that a format of a PUCCH resource corresponding to the CSI is a first format.

The receiving module 403 is configured to receive the CSI carried on a first first-format PUCCH resource.

Optionally, in this embodiment of the present invention, the at least two PUCCH resources include a PUCCH resource corresponding to a PUCCH format 2 and a PUCCH resource corresponding to a PUCCH format 3; or the at least two PUCCH resources include a PUCCH resource corresponding to a PUCCH format 2 and a PUCCH resource corresponding to a PUCCH format 4; or the at least two PUCCH resources include a PUCCH resource corresponding to a PUCCH format 3 and a PUCCH resource corresponding to a PUCCH format 4; or the at least two PUCCH resources include a PUCCH resource corresponding to a PUCCH format 2, a PUCCH resource corresponding to a PUCCH format 3, and a PUCCH resource corresponding to a PUCCH format 4.

Optionally, in this embodiment of the present invention, the second determining module 402 is specifically configured to:

determine, according to a quantity of carriers corresponding to the CSI, that the format of the PUCCH resource corresponding to the CSI is the first format; or determine, according to a quantity of bits of the CSI, that the format of the PUCCH resource corresponding to the CSI is the first format.

Optionally, in this embodiment of the present invention, the at least two PUCCH resources include the PUCCH resource corresponding to the PUCCH format 2 and the PUCCH resource corresponding to the PUCCH format 3; and that the second determining module 402 is specifically configured to determine, according to a quantity of carriers corresponding to the CSI, that the format of the PUCCH resource corresponding to the CSI is the first format is specifically:

if the quantity of carriers is greater than a first quantity, determining that the format of the PUCCH resource corresponding to the CSI is the PUCCH format 3; otherwise, determining that the format of the PUCCH resource corresponding to the CSI is the PUCCH format 2; or that the second determining module 402 is specifically configured to determine, according to a quantity of bits of the CSI, that the format of the PUCCH resource corresponding to the CSI is the first format is specifically:

if the quantity of bits is greater than a third quantity, determining that the format of the PUCCH resource corresponding to the CSI is the PUCCH format 3; otherwise, determining that the format of the PUCCH resource corresponding to the CSI is the PUCCH format 2.

Optionally, in this embodiment of the present invention, the at least two PUCCH resources include the PUCCH resource corresponding to the PUCCH format 2 and the PUCCH resource corresponding to the PUCCH format 4; and that the second determining module 402 is specifically configured to determine, according to a quantity of carriers corresponding to the CSI, that the format of the PUCCH resource corresponding to the CSI is the first format is specifically:

if the quantity of carriers is greater than a first quantity, determining that the format of the PUCCH resource corresponding to the CSI is the PUCCH format 4; otherwise, determining that the format of the PUCCH resource corresponding to the CSI is the PUCCH format 2; or that the second determining module 402 is specifically configured to determine, according to a quantity of bits of the CSI, that the format of the PUCCH resource corresponding to the CSI is the first format is specifically:

if the quantity of bits is greater than a third quantity, determining that the format of the PUCCH resource corresponding to the CSI is the PUCCH format 4; otherwise, determining that the format of the PUCCH resource corresponding to the CSI is the PUCCH format 2.

Optionally, in this embodiment of the present invention, the at least two PUCCH resources include the PUCCH resource corresponding to the PUCCH format 3 and the PUCCH resource corresponding to the PUCCH format 4; and that the second determining module 402 is specifically configured to determine, according to a quantity of carriers corresponding to the CSI, that the format of the PUCCH resource corresponding to the CSI is the first format is specifically:

if the quantity of carriers is greater than a second quantity, determining that the format of the PUCCH resource corresponding to the CSI is the PUCCH format 4; otherwise, determining that the format of the PUCCH resource corresponding to the CSI is the PUCCH format 3; or that the second determining module 402 is specifically configured to determine, according to a quantity of bits of the CSI, that the format of the PUCCH resource corresponding to the CSI is the first format is specifically:

if the quantity of bits is greater than a fourth quantity, determining that the format of the PUCCH resource corresponding to the CSI is the PUCCH format 4; otherwise, determining that the format of the PUCCH resource corresponding to the CSI is the PUCCH format 3.

Optionally, in this embodiment of the present invention, the at least two PUCCH resources include the PUCCH resource corresponding to the PUCCH format 2, the PUCCH resource corresponding to the PUCCH format 3, and the PUCCH resource corresponding to the PUCCH format 4; and that the second determining module 402 is specifically configured to determine, according to a quantity of carriers corresponding to the CSI, that the format of the PUCCH resource corresponding to the CSI is the first format is specifically:

if the quantity of carriers is less than or equal to a first quantity, determining that the format of the PUCCH resource corresponding to the CSI is the PUCCH format 2; or if the quantity of carriers is greater than the first quantity and is less than or equal to a second quantity, determining that the format of the PUCCH resource corresponding to the CSI is the PUCCH format 3; or if the quantity of carriers is greater than the second quantity, determining that the format of the PUCCH resource corresponding to the CSI is the PUCCH format 4; or that the second determining module 402 is specifically configured to determine, according to a quantity of bits of the CSI, that the format of the PUCCH resource corresponding to the CSI is the first format is specifically:

if the quantity of bits is less than or equal to a third quantity, determining that the format of the PUCCH resource corresponding to the CSI is the PUCCH format 2; or if the quantity of bits is greater than the third quantity and is less than or equal to a fourth quantity, determining that the format of the PUCCH resource corresponding to the CSI is the PUCCH format 3; or if the quantity of bits is greater than the fourth quantity, determining that the format of the PUCCH resource corresponding to the CSI is the PUCCH format 4.

Optionally, in this embodiment of the present invention, the network device further includes a third determining module and a fourth determining module.

The third determining module is configured to: before the receiving module 403 receives the CSI carried on a first first-format PUCCH resource, determine the first PUCCH resource from at least one first-format PUCCH resource corresponding to each of the one or more downlink carrier groups to which the CSI belongs.

The fourth determining module is configured to determine to receive the CSI by using the first PUCCH resource.

Optionally, in this embodiment of the present invention, the third determining module is specifically configured to:

determine the first PUCCH resource from the at least one PUCCH resource according to received information sent by the network device; or determine, from the at least one PUCCH resource, a smallest-numbered PUCCH resource as the first PUCCH resource; or determine, from the at least one PUCCH resource, a largest-numbered PUCCH resource as the first PUCCH resource; or determine, from at least one carrier corresponding to the at least one PUCCH resource, a PUCCH resource corresponding to a smallest-numbered carrier as the first PUCCH resource; or determine, from at least one carrier corresponding to the at least one PUCCH resource, a PUCCH resource corresponding to a largest-numbered carrier as the first PUCCH resource.

Figure 5:
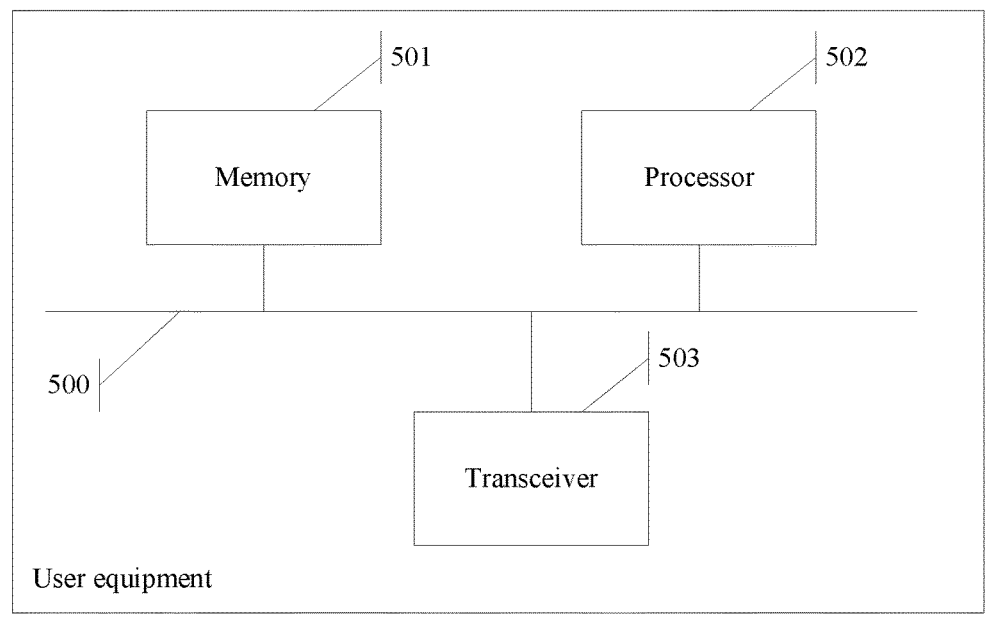
FIG. 5 is a schematic structural diagram of user equipment according to an embodiment of the present invention.

Referring to FIG. 5, based on a same inventive concept, an embodiment of the present invention provides user equipment. The user equipment may include a memory 501, a processor 502, and a transceiver 503 that are connected to a bus 500.

The memory 501 is configured to store an instruction required by the processor 502 for executing a task.

The processor 502 is configured to: execute the instruction stored by the memory 501, to obtain channel state information CSI that is to be reported in an uplink subframe, where the to-be-reported CSI is corresponding to one or more downlink carrier groups, at least two physical uplink control channel PUCCH resources are configured for one downlink carrier group, and the at least two PUCCH resources have different formats; determine, according to the to-be-reported CSI, that a format of a PUCCH resource corresponding to the to-be-reported CSI is a first format; and add the to-be-reported CSI to a first first-format PUCCH resource, and report the to-be-reported CSI by using the transceiver 503.

Optionally, in this embodiment of the present invention, the at least two PUCCH resources include a PUCCH resource corresponding to a PUCCH format 2 and a PUCCH resource corresponding to a PUCCH format 3; or the at least two PUCCH resources include a PUCCH resource corresponding to a PUCCH format 2 and a PUCCH resource corresponding to a PUCCH format 4; or the at least two PUCCH resources include a PUCCH resource corresponding to a PUCCH format 3 and a PUCCH resource corresponding to a PUCCH format 4; or the at least two PUCCH resources include a PUCCH resource corresponding to a PUCCH format 2, a PUCCH resource corresponding to a PUCCH format 3, and a PUCCH resource corresponding to a PUCCH format 4.

Optionally, in this embodiment of the present invention, that the processor 502 is configured to determine, according to the to-be-reported CSI, that a format of a PUCCH resource corresponding to the to-be-reported CSI is a first format is specifically:

determining, according to a quantity of carriers corresponding to the to-be-reported CSI, that the format of the PUCCH resource corresponding to the to-be-reported CSI is the first format; or determining, according to a quantity of bits of the to-be-reported CSI, that the format of the PUCCH resource corresponding to the to-be-reported CSI is the first format.

Optionally, in this embodiment of the present invention, the at least two PUCCH resources include the PUCCH resource corresponding to the PUCCH format 2 and the PUCCH resource corresponding to the PUCCH format 3; and that the processor 502 is specifically configured to determine, according to a quantity of carriers corresponding to the to-be-reported CSI, that the format of the PUCCH resource corresponding to the to-be-reported CSI is the first format is specifically:

if the quantity of carriers is greater than a first quantity, determining that the format of the PUCCH resource corresponding to the to-be-reported CSI is the PUCCH format 3; otherwise, determining that the format of the PUCCH resource corresponding to the to-be-reported CSI is the PUCCH format 2; or that the processor 502 is specifically configured to determine, according to a quantity of bits of the to-be-reported CSI, that the format of the PUCCH resource corresponding to the to-be-reported CSI is the first format is specifically:

if the quantity of bits is greater than a third quantity, determining that the format of the PUCCH resource corresponding to the to-be-reported CSI is the PUCCH format 3; otherwise, determining that the format of the PUCCH resource corresponding to the to-be-reported CSI is the PUCCH format 2.

Optionally, in this embodiment of the present invention, the at least two PUCCH resources include the PUCCH resource corresponding to the PUCCH format 2 and the PUCCH resource corresponding to the PUCCH format 4; and that the processor 502 is specifically configured to determine, according to a quantity of carriers corresponding to the to-be-reported CSI, that the format of the PUCCH resource corresponding to the to-be-reported CSI is the first format is specifically:

if the quantity of carriers is greater than a first quantity, determining that the format of the PUCCH resource corresponding to the to-be-reported CSI is the PUCCH format 4; otherwise, determining that the format of the PUCCH resource corresponding to the to-be-reported CSI is the PUCCH format 2; or that the processor 502 is specifically configured to determine, according to a quantity of bits of the to-be-reported CSI, that the format of the PUCCH resource corresponding to the to-be-reported CSI is the first format is specifically:

if the quantity of bits is greater than a third quantity, determining that the format of the PUCCH resource corresponding to the to-be-reported CSI is the PUCCH format 4; otherwise, determining that the format of the PUCCH resource corresponding to the to-be-reported CSI is the PUCCH format 2.

Optionally, in this embodiment of the present invention, the at least two PUCCH resources include the PUCCH resource corresponding to the PUCCH format 3 and the PUCCH resource corresponding to the PUCCH format 4; and that the processor 502 is specifically configured to determine, according to a quantity of carriers corresponding to the to-be-reported CSI, that the format of the PUCCH resource corresponding to the to-be-reported CSI is the first format is specifically:

if the quantity of carriers is greater than a second quantity, determining that the format of the PUCCH resource corresponding to the to-be-reported CSI is the PUCCH format 4; otherwise, determining that the format of the PUCCH resource corresponding to the to-be-reported CSI is the PUCCH format 3; or that the processor 502 is specifically configured to determine, according to a quantity of bits of the to-be-reported CSI, that the format of the PUCCH resource corresponding to the to-be-reported CSI is the first format is specifically:

if the quantity of bits is greater than a fourth quantity, determining that the format of the PUCCH resource corresponding to the to-be-reported CSI is the PUCCH format 4; otherwise, determining that the format of the PUCCH resource corresponding to the to-be-reported CSI is the PUCCH format 3.

Optionally, in this embodiment of the present invention, the at least two PUCCH resources include the PUCCH resource corresponding to the PUCCH format 2, the PUCCH resource corresponding to the PUCCH format 3, and the PUCCH resource corresponding to the PUCCH format 4; and that the processor 502 is specifically configured to determine, according to a quantity of carriers corresponding to the to-be-reported CSI, that the format of the PUCCH resource corresponding to the to-be-reported CSI is the first format is specifically:

if the quantity of carriers is less than or equal to a first quantity, determining that the format of the PUCCH resource corresponding to the to-be-reported CSI is the PUCCH format 2; or if the quantity of carriers is greater than the first quantity and is less than or equal to a second quantity, determining that the format of the PUCCH resource corresponding to the to-be-reported CSI is the PUCCH format 3; or if the quantity of carriers is greater than the second quantity, determining that the format of the PUCCH resource corresponding to the to-be-reported CSI is the PUCCH format 4; or that the processor 502 is specifically configured to determine, according to a quantity of bits of the to-be-reported CSI, that the format of the PUCCH resource corresponding to the to-be-reported CSI is the first format is specifically:

if the quantity of bits is less than or equal to a third quantity, determining that the format of the PUCCH resource corresponding to the to-be-reported CSI is the PUCCH format 2; or if the quantity of bits is greater than the third quantity and is less than or equal to a fourth quantity, determining that the format of the PUCCH resource corresponding to the to-be-reported CSI is the PUCCH format 3; or if the quantity of bits is greater than the fourth quantity, determining that the format of the PUCCH resource corresponding to the to-be-reported CSI is the PUCCH format 4.

Optionally, in this embodiment of the present invention, that the processor 502 is configured to add the to-be-reported CSI to a first first-format PUCCH resource, and report the to-be-reported CSI by using the transceiver 503 is specifically:

determining the first PUCCH resource from at least one first-format PUCCH resource corresponding to each of the one or more downlink carrier groups to which the to-be-reported CSI belongs; and adding the to-be-reported CSI to the first PUCCH resource, and reporting the to-be-reported CSI by using the transceiver.

Optionally, in this embodiment of the present invention, that the processor 502 is specifically configured to determine the first PUCCH resource from at least one first-format PUCCH resource corresponding to each of the one or more downlink carrier groups to which the to-be-reported CSI belongs is specifically:

determining the first PUCCH resource from the at least one PUCCH resource according to information that is sent by a network device and that is received by the transceiver 503; or determining, from the at least one PUCCH resource, a smallest-numbered PUCCH resource as the first PUCCH resource; or determining, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

Figure 6:
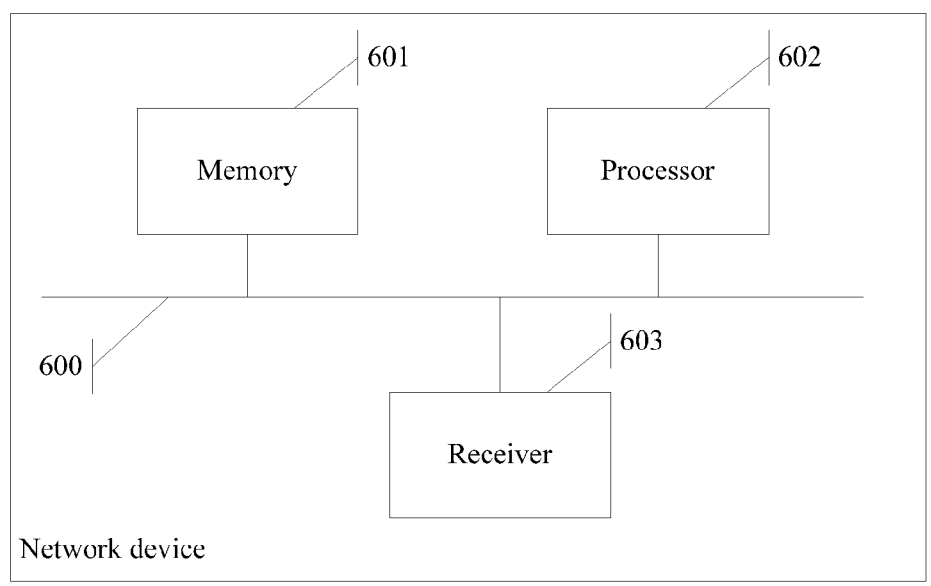
FIG. 6 is a schematic structural diagram of a network device according to an embodiment of the present invention.

Referring to FIG. 6, based on a same inventive concept, an embodiment of the present invention provides a network device. The network device may be a base station. The network device may include a memory 601, a processor 602, and a receiver 603 that are connected to a bus 600.

The memory 601 is configured to store an instruction required by the processor 602 for executing a task.

The processor 602 is configured to: execute the instruction, to determine CSI that is to be reported by user equipment in an uplink subframe, where the CSI is corresponding to one or more downlink carrier groups, at least two PUCCH resources are configured for one downlink carrier group, and the at least two PUCCH resources have different formats; and determine, according to the CSI, that a format of a PUCCH resource corresponding to the CSI is a first format.

The receiver 603 is configured to receive the CSI carried on a first first-format PUCCH resource.

Optionally, in this embodiment of the present invention, the at least two PUCCH resources include a PUCCH resource corresponding to a PUCCH format 2 and a PUCCH resource corresponding to a PUCCH format 3; or the at least two PUCCH resources include a PUCCH resource corresponding to a PUCCH format 2 and a PUCCH resource corresponding to a PUCCH format 4; or the at least two PUCCH resources include a PUCCH resource corresponding to a PUCCH format 3 and a PUCCH resource corresponding to a PUCCH format 4; or the at least two PUCCH resources include a PUCCH resource corresponding to a PUCCH format 2, a PUCCH resource corresponding to a PUCCH format 3, and a PUCCH resource corresponding to a PUCCH format 4.

Optionally, in this embodiment of the present invention, that the processor 602 is configured to determine, according to the CSI, that a format of a PUCCH resource corresponding to the CSI is a first format is specifically:

determining, according to a quantity of carriers corresponding to the CSI, that the format of the PUCCH resource corresponding to the CSI is the first format; or determining, according to a quantity of bits of the CSI, that the format of the PUCCH resource corresponding to the CSI is the first format.

Optionally, in this embodiment of the present invention, the at least two PUCCH resources include the PUCCH resource corresponding to the PUCCH format 2 and the PUCCH resource corresponding to the PUCCH format 3; and that the processor 602 is specifically configured to determine, according to a quantity of carriers corresponding to the CSI, that the format of the PUCCH resource corresponding to the CSI is the first format is specifically:

if the quantity of carriers is greater than a first quantity, determining that the format of the PUCCH resource corresponding to the CSI is the PUCCH format 3; otherwise, determining that the format of the PUCCH resource corresponding to the CSI is the PUCCH format 2; or that the processor 602 is specifically configured to determine, according to a quantity of bits of the CSI, that the format of the PUCCH resource corresponding to the CSI is the first format is specifically:

if the quantity of bits is greater than a third quantity, determining that the format of the PUCCH resource corresponding to the CSI is the PUCCH format 3; otherwise, determining that the format of the PUCCH resource corresponding to the CSI is the PUCCH format 2.

Optionally, in this embodiment of the present invention, the at least two PUCCH resources include the PUCCH resource corresponding to the PUCCH format 2 and the PUCCH resource corresponding to the PUCCH format 4; and that the processor 602 is specifically configured to determine, according to a quantity of carriers corresponding to the CSI, that the format of the PUCCH resource corresponding to the CSI is the first format is specifically:

if the quantity of carriers is greater than a first quantity, determining that the format of the PUCCH resource corresponding to the CSI is the PUCCH format 4; otherwise, determining that the format of the PUCCH resource corresponding to the CSI is the PUCCH format 2; or that the processor 602 is specifically configured to determine, according to a quantity of bits of the CSI, that the format of the PUCCH resource corresponding to the CSI is the first format is specifically:

if the quantity of bits is greater than a third quantity, determining that the format of the PUCCH resource corresponding to the CSI is the PUCCH format 4; otherwise, determining that the format of the PUCCH resource corresponding to the CSI is the PUCCH format 2.

Optionally, in this embodiment of the present invention, the at least two PUCCH resources include the PUCCH resource corresponding to the PUCCH format 3 and the PUCCH resource corresponding to the PUCCH format 4; and that the processor 602 is specifically configured to determine, according to a quantity of carriers corresponding to the CSI, that the format of the PUCCH resource corresponding to the CSI is the first format is specifically:

if the quantity of carriers is greater than a second quantity, determining that the format of the PUCCH resource corresponding to the CSI is the PUCCH format 4; otherwise, determining that the format of the PUCCH resource corresponding to the CSI is the PUCCH format 3; or that the processor 602 is specifically configured to determine, according to a quantity of bits of the CSI, that the format of the PUCCH resource corresponding to the CSI is the first format is specifically:

if the quantity of bits is greater than a fourth quantity, determining that the format of the PUCCH resource corresponding to the CSI is the PUCCH format 4; otherwise, determining that the format of the PUCCH resource corresponding to the CSI is the PUCCH format 3.

Optionally, in this embodiment of the present invention, the at least two PUCCH resources include the PUCCH resource corresponding to the PUCCH format 2, the PUCCH resource corresponding to the PUCCH format 3, and the PUCCH resource corresponding to the PUCCH format 4; and that the processor 602 is specifically configured to determine, according to a quantity of carriers corresponding to the CSI, that the format of the PUCCH resource corresponding to the CSI is the first format is specifically:

if the quantity of carriers is less than or equal to a first quantity, determining that the format of the PUCCH resource corresponding to the CSI is the PUCCH format 2; or if the quantity of carriers is greater than the first quantity and is less than or equal to a second quantity, determining that the format of the PUCCH resource corresponding to the CSI is the PUCCH format 3; or if the quantity of carriers is greater than the second quantity, determining that the format of the PUCCH resource corresponding to the CSI is the PUCCH format 4; or that the processor 602 is specifically configured to determine, according to a quantity of bits of the CSI, that the format of the PUCCH resource corresponding to the CSI is the first format is specifically:

if the quantity of bits is less than or equal to a third quantity, determining that the format of the PUCCH resource corresponding to the CSI is the PUCCH format 2; or if the quantity of bits is greater than the third quantity and is less than or equal to a fourth quantity, determining that the format of the PUCCH resource corresponding to the CSI is the PUCCH format 3; or if the quantity of bits is greater than the fourth quantity, determining that the format of the PUCCH resource corresponding to the CSI is the PUCCH format 4.

Optionally, in this embodiment of the present invention, the processor 602 is further configured to:

before the receiver 603 receives the CSI carried on a first first-format PUCCH resource, determine the first PUCCH resource from at least one first-format PUCCH resource corresponding to each of the one or more downlink carrier groups to which the CSI belongs; and determine to receive the CSI by using the first PUCCH resource.

Optionally, in this embodiment of the present invention, that the processor 602 is specifically configured to determine the first PUCCH resource from at least one first-format PUCCH resource corresponding to each of the one or more downlink carrier groups to which the to-be-reported CSI belongs is specifically:

determining the first PUCCH resource from the at least one PUCCH resource according to received information sent by the network device; or determining, from the at least one PUCCH resource, a smallest-numbered PUCCH resource as the first PUCCH resource; or determine, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

In this embodiment of the present invention, at least two PUCCH resources are configured for each downlink carrier group. CSI that needs to be reported in one uplink subframe may be obtained, and a format of a corresponding PUCCH resource is determined according to the to-be-reported CSI. For example, the determined format is referred to as a first format. Then, all of the to-be-reported CSI is reported after being added to a first first-format PUCCH resource. Therefore, in this embodiment of the present invention, the CSI that needs to be reported in one uplink subframe may be reported by occupying only one PUCCH resource. This greatly reduces PUCCH resource overheads and improves a throughput of an uplink system compared with a prior-art solution that each CSI needs to occupy one PUCCH resource.

Moreover, in the prior art, if CSI of different carriers needs to be reported in one uplink subframe, only one piece of CSI can be selected for reporting, and other non-selected CSI is discarded. That is, CSI corresponding to some carriers cannot be reported, and a base station cannot perform effective downlink data scheduling for a downlink carrier corresponding to the unreported CSI. This causes performance deterioration of a downlink system. However, after the technical solution in this embodiment of the present invention is used, CSI that needs to be reported in one uplink subframe can be reported after being added to a same PUCCH resource. This avoids, as far as possible, discarding CSI, and ensures that CSI of all downlink carriers that needs to be reported can be reported, so that a base station can relatively effectively schedule the downlink carriers, thereby improving performance of the downlink system.

It may be clearly understood by a person skilled in the art that, for the purpose of convenient and brief description, division of the foregoing function modules is taken as an example for illustration. In actual application, the foregoing functions can be allocated to different function modules and implemented according to a requirement. That is, an inner structure of an apparatus is divided into different function modules to implement all or some of the functions described above. For a detailed working process of the foregoing system, apparatus, and unit, refer to a corresponding process in the foregoing method embodiments, and details are not further described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, and some features may be ignored or not performed. In addition, the displayed or discussed mutual couplings or direct couplings or communication connections may be indirect couplings or communication connections between some interfaces, apparatuses, or units, and may be implemented in electronic, mechanical, or other forms.

The units described as separate parts may or may not be physically separate. Parts displayed as units may or may not be physical units, and may be located in one position or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor (processor) to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely used to describe the technical solutions of the present application. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. A channel state information (CSI) reporting method, comprising:
    obtaining CSI that is to be reported in an uplink subframe, wherein the to-be-reported CSI is corresponding to one or more downlink carrier groups, at least two physical uplink control channel (PUCCH) resources are configured for one downlink carrier group, and the at least two PUCCH resources have different formats;
    determining, according to a quantity of carriers corresponding to the to-be-reported CSI, that a format of a PUCCH resource corresponding to the to-be-reported CSI is a first format; and
    adding the to-be-reported CSI to a first first-format PUCCH resource, and reporting the to-be-reported CSI.

2. The method according to claim 1, wherein:
    the at least two PUCCH resources comprise a PUCCH resource corresponding to a PUCCH format 2 and a PUCCH resource corresponding to a PUCCH format 3; or
    the at least two PUCCH resources comprise a PUCCH resource corresponding to a PUCCH format 2 and a PUCCH resource corresponding to a PUCCH format 4; or
    the at least two PUCCH resources comprise a PUCCH resource corresponding to a PUCCH format 3 and a PUCCH resource corresponding to a PUCCH format 4; or
    the at least two PUCCH resources comprise a PUCCH resource corresponding to a PUCCH format 2, a PUCCH resource corresponding to a PUCCH format 3, and a PUCCH resource corresponding to a PUCCH format 4.

3. The method according to claim 1, wherein the adding the to-be-reported CSI to a first first-format PUCCH resource, and reporting the to-be-reported CSI comprises:
    determining the first PUCCH resource from at least one first-format PUCCH resource corresponding to each of the one or more downlink carrier groups to which the to-be-reported CSI belongs; and
    adding the to-be-reported CSI to the first PUCCH resource, and reporting the to-be-reported CSI.

4. The method according to claim 3, wherein the determining the first PUCCH resource from at least one first-format PUCCH resource corresponding to each of the one or more downlink carrier groups to which the to-be-reported CSI belongs comprises:
    determining the first PUCCH resource from the at least one PUCCH resource according to received information sent by a network device; or
    determining, from the at least one PUCCH resource, a smallest-numbered PUCCH resource as the first PUCCH resource; or
    determining, from the at least one PUCCH resource, a largest-numbered PUCCH resource as the first PUCCH resource; or
    determining, from at least one carrier corresponding to the at least one PUCCH resource, a PUCCH resource corresponding to a smallest-numbered carrier as the first PUCCH resource; or
    determining, from at least one carrier corresponding to the at least one PUCCH resource, a PUCCH resource corresponding to a largest-numbered carrier as the first PUCCH resource.

5. A channel state information (CSI) receiving method, comprising:
    determining CSI that is to be reported by user equipment in an uplink subframe, wherein the CSI is corresponding to one or more downlink carrier groups, at least two physical uplink control channel (PUCCH) resources are configured for one downlink carrier group, and the at least two PUCCH resources have different formats;
    determining, according to a quantity of carriers corresponding to the CSI, that a format of the PUCCH resource corresponding to the CSI is a first format; and
    receiving the CSI carried on a first first-format PUCCH resource.

6. The method according to claim 5, wherein:
    the at least two PUCCH resources comprise a PUCCH resource corresponding to a PUCCH format 2 and a PUCCH resource corresponding to a PUCCH format 3; or
    the at least two PUCCH resources comprise a PUCCH resource corresponding to a PUCCH format 2 and a PUCCH resource corresponding to a PUCCH format 4; or
    the at least two PUCCH resources comprise a PUCCH resource corresponding to a PUCCH format 3 and a PUCCH resource corresponding to a PUCCH format 4;

or the at least two PUCCH resources comprise a PUCCH resource corresponding to a PUCCH format 2, a PUCCH resource corresponding to a PUCCH format 3, and a PUCCH resource corresponding to a PUCCH format 4.

7. The method according to claim 5, before the receiving the CSI carried on a first first-format PUCCH resource, further comprising:

determining the first PUCCH resource from at least one first-format PUCCH resource corresponding to each of the one or more downlink carrier groups to which the CSI belongs; and determining to receive the CSI by using the first PUCCH resource.

8. The method according to claim 7, wherein the determining the first PUCCH resource from at least one first-format PUCCH resource corresponding to each of the one or more downlink carrier groups to which the CSI belongs comprises:

determining the first PUCCH resource from the at least one PUCCH resource according to received information sent by a network device; or determining, from the at least one PUCCH resource, a smallest-numbered PUCCH resource as the first PUCCH resource; or determining, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

9. A user equipment, comprising:

a processor, configured to obtain channel state information (CSI) that is to be reported in an uplink subframe, wherein the to-be-reported CSI is corresponding to one or more downlink carrier groups, at least two physical uplink control channel (PUCCH) resources are configured for one downlink carrier group, and the at least two PUCCH resources have different formats;

determine, according to a quantity of carriers corresponding to the to-be-reported CSI, that a format of a PUCCH resource corresponding to the to-be-reported CSI is a first format; and a transceiver, configured to add the to-be-reported CSI to a first first-format PUCCH resource, and report the to-be-reported CSI.

10. The user equipment according to claim 9, wherein:

the at least two PUCCH resources comprise a PUCCH resource corresponding to a PUCCH format 2 and a PUCCH resource corresponding to a PUCCH format 3; or the at least two PUCCH resources comprise a PUCCH resource corresponding to a PUCCH format 2 and a PUCCH resource corresponding to a PUCCH format 4; or the at least two PUCCH resources comprise a PUCCH resource corresponding to a PUCCH format 3 and a PUCCH resource corresponding to a PUCCH format 4; or the at least two PUCCH resources comprise a PUCCH resource corresponding to a PUCCH format 2, a PUCCH resource corresponding to a PUCCH format 3, and a PUCCH resource corresponding to a PUCCH format 4.

11. The user equipment according to claim 9, wherein the processor is configured to:

determine the first PUCCH resource from at least one first-format PUCCH resource corresponding to each of the one or more downlink carrier groups to which the to-be-reported CSI belongs.

12. The user equipment according to claim 11, wherein the processor is configured to:

determining the first PUCCH resource from the at least one PUCCH resource according to received information sent by a network device; or determining, from the at least one PUCCH resource, a smallest-numbered PUCCH resource as the first PUCCH resource; or determining, from the at least one PUCCH resource, a largest-numbered PUCCH resource as the first PUCCH resource; or determining, from at least one carrier corresponding to the at least one PUCCH resource, a PUCCH resource corresponding to a smallest-numbered carrier as the first PUCCH resource; or determining, from at least one carrier corresponding to the at least one PUCCH resource, a PUCCH resource corresponding to a largest-numbered carrier as the first PUCCH resource.

13. A network device, comprising:

a processor, configured to determine channel state information (CSI) that is to be reported by user equipment in an uplink subframe, wherein the CSI is corresponding to one or more downlink carrier groups, at least two physical uplink control channel (PUCCH) resources are configured for one downlink carrier group, and the at least two PUCCH resources have different formats;

to determine, according to a quantity of carriers corresponding to the CSI, that a format of a PUCCH resource corresponding to the CSI is a first format; and a receiver, configured to receive the CSI carried on a first first-format PUCCH resource.

14. The network device according to claim 13, wherein:

the at least two PUCCH resources comprise a PUCCH resource corresponding to a PUCCH format 2 and a PUCCH resource corresponding to a PUCCH format 3; or the at least two PUCCH resources comprise a PUCCH resource corresponding to a PUCCH format 2 and a PUCCH resource corresponding to a PUCCH format 4; or the at least two PUCCH resources comprise a PUCCH resource corresponding to a PUCCH format 3 and a PUCCH resource corresponding to a PUCCH format 4; or the at least two PUCCH resources comprise a PUCCH resource corresponding to a PUCCH format 2, a PUCCH resource corresponding to a PUCCH format 3, and a PUCCH resource corresponding to a PUCCH format 4.

15. The network device according to claim 13, wherein the processor is configured to determine the first PUCCH resource from at least one first-format PUCCH resource corresponding to each of the one or more downlink carrier groups to which the CSI belongs.

16. The network device according to claim 15, wherein the processor is configured to:

determine the first PUCCH resource from the at least one PUCCH resource according to received information sent by the network device; or determine, from the at least one PUCCH resource, a smallest-numbered PUCCH resource as the first PUCCH resource; or determine, from the at least one PUCCH resource, a largest-numbered PUCCH resource as the first PUCCH resource; or determine, from at least one carrier corresponding to the at least one PUCCH resource, a PUCCH resource corresponding to a smallest-numbered carrier as the first PUCCH resource; or determine, from at least one carrier corresponding to the at least one PUCCH resource, a PUCCH resource corresponding to a largest-numbered carrier as the first PUCCH resource.

17. A non-transitory computer readable storage medium storing instructions, which when executed by a computer processor, cause the computer processor to execute steps comprising:

obtaining channel state information (CSI) that is to be reported in an uplink subframe, wherein the to-be-reported CSI is corresponding to one or more downlink carrier groups, at least two physical uplink control channel (PUCCH) resources are configured for one downlink carrier group, and the at least two PUCCH resources have different formats;

determining, according to a quantity of carriers corresponding to the to-be-reported CSI, that a format of a PUCCH resource corresponding to the to-be-reported CSI is a first format; and adding the to-be-reported CSI to a first first-format PUCCH resource, and reporting the to-be-reported CSI.

18. The non-transitory computer readable storage medium according to claim 17, wherein:

the at least two PUCCH resources comprise a PUCCH resource corresponding to a PUCCH format 2 and a PUCCH resource corresponding to a PUCCH format 3; or the at least two PUCCH resources comprise a PUCCH resource corresponding to a PUCCH format 2 and a PUCCH resource corresponding to a PUCCH format 4; or the at least two PUCCH resources comprise a PUCCH resource corresponding to a PUCCH format 3 and a PUCCH resource corresponding to a PUCCH format 4; or the at least two PUCCH resources comprise a PUCCH resource corresponding to a PUCCH format 2, a PUCCH resource corresponding to a PUCCH format 3, and a PUCCH resource corresponding to a PUCCH format 4.

19. A non-transitory computer readable storage medium storing instructions, which when executed by a computer processor, cause the computer processor to execute steps comprising:

determining channel state information (CSI) that is to be reported by user equipment in an uplink subframe, wherein the CSI is corresponding to one or more downlink carrier groups, at least two physical uplink control channel (PUCCH) resources are configured for one downlink carrier group, and the at least two PUCCH resources have different formats;

determining, according to a quantity of carriers corresponding to the CSI, that a format of the PUCCH resource corresponding to the CSI is a first format; and receiving the CSI carried on a first first-format PUCCH resource.

20. The non-transitory computer readable storage medium according to claim 19, wherein:

the at least two PUCCH resources comprise a PUCCH resource corresponding to a PUCCH format 2 and a PUCCH resource corresponding to a PUCCH format 3; or the at least two PUCCH resources comprise a PUCCH resource corresponding to a PUCCH format 2 and a PUCCH resource corresponding to a PUCCH format 4; or the at least two PUCCH resources comprise a PUCCH resource corresponding to a PUCCH format 3 and a PUCCH resource corresponding to a PUCCH format 4; or the at least two PUCCH resources comprise a PUCCH resource corresponding to a PUCCH format 2, a PUCCH resource corresponding to a PUCCH format 3, and a PUCCH resource corresponding to a PUCCH format 4.

* * * * *